US005215872A

United States Patent [19]

Goto et al.

[11] Patent Number: 5,215,872

[45] Date of Patent: Jun. 1, 1993

[54] METHOD OF PROCESSING A SILVER HALIDE COLOR PHOTOGRAPHIC MATERIAL

[75] Inventors: Masatoshi Goto; Keiji Mihayashi, both of Kanagawa, Japan

[73] Assignee: Fuji Photo Film Co., Ltd., Kanagawa, Japan

[21] Appl. No.: 685,771

[22] Filed: Apr. 16, 1991

[30] Foreign Application Priority Data

Apr. 17, 1990 [JP] Japan ................................ 2-101160

[51] Int. Cl.[5] ................................ G01C 7/32

[52] U.S. Cl. ................................ 430/387; 430/384; 430/385; 430/386; 430/388; 430/389; 430/393; 430/430; 430/434; 430/957; 430/963

[58] Field of Search ............... 430/376, 383, 384, 385, 430/386, 387, 388, 389, 393, 430, 434, 460, 956, 957, 958, 959, 960, 963

[56] References Cited

U.S. PATENT DOCUMENTS 4,477,563 10/1984 Ichijima et al. .................... 430/544

4,812,389 3/1989 Sakanoue et al. .................. 430/957

5,004,677 4/1991 Ueda ................................ 430/393

FOREIGN PATENT DOCUMENTS 0330936 9/1989 European Pat. Off. .

*Primary Examiner*—Hoa Van Le

*Attorney, Agent, or Firm*—Sughrue, Mion, Zinn, Macpeak & Seas

[57] ABSTRACT

A method of processing a silver halide color photographic material is disclosed, comprising a support having provided thereon at least one light-sensitive emulsion layer, which comprises the steps of color developing the material with a developer to which a replenisher is added and bleaching the developed material, wherein the material contains a coupler represented by the following general formula (I) and the amount of replenisher added to the color developer is 600 ml or less per $m^2$ of the material:

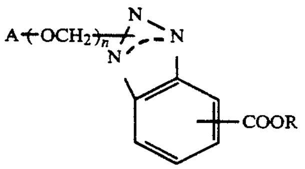

(I)

wherein A represents a coupler group, and when A is a phenol or naphthol coupler group, n is 1, and when A is any other coupler group, n is 0; and R represents an alkyl group having from 1 to 4 carbon atoms, or a pyridyl group. Images having excellent photographic characteristics are obtained by the method even though the amount of the replenisher is reduced.

13 Claims, No Drawings

METHOD OF PROCESSING A SILVER HALIDE COLOR PHOTOGRAPHIC MATERIAL

FIELD OF THE INVENTION

The present invention relates to a method of processing a silver halide color photographic material and, in particular, to an improved method of processing a picture-taking silver halide color photographic material which forms an excellent photographic image on the material and which uses a reduced amount of replenisher for the color developer.

BACKGROUND OF THE INVENTION

Recently, techniques of reducing the amount of liquid wastes to be drained during processing of photographic materials have been developed because of the need to prevent water pollution and to reduce processing costs, and industrial application of some developed techniques to some processing steps has already been attempted. In particular, in the color development step, as the pollution load of the liquid waste to be drained from this step is extremely large, various methods of reducing the amount of liquid waste have been proposed. For instance, there are known methods of regenerating a used color developer by means of electric dialysis as described in JP-A-54-37731, JP-A-56-1048, JP-A-56-1049, JP-A-56-27142, JP-A-56-33644, JP-A-56-149036, and JP-B-61-10199; methods of regenerating a used color developer by the use of an active charcoal as described in JP-B-55-1571 and JP-A-58-14831; methods of regenerating a used color developer by the use of an ion-exchange membrane as described in JP-A-52-105820; and methods of regenerating a used color developer by the use of an ion-exchange resin as described in JP-A-55-144240, JP-A-57-146249 and JP-A-61-95352. (The terms "JP-A" and "JP-B" as used herein mean an "unexamined published Japanese patent application" and an "examined Japanese patent publication", respectively.)

However, in these methods, it is necessary to analyze the color developer so as to control its composition and therefore high-technology process control techniques and expensive equipment are necessary for the analysis. As a result, these methods have come into only limited use, principally in large-scale laboratories.

In addition to the above-mentioned regeneration methods, other methods of reducing the amount of the replenisher added to the color developer have been proposed, in which the composition of the replenisher added to the color developer (hereinafter referred to as a "color developer replenisher") is adjusted. One means of adjusting the composition of the replenisher in such a low-replenishment processing system involves concentrating in the replenisher the expendable components, such as the color developing agent and the preservative, so that the necessary components in the necessary amounts will be replenished in the color developer even though the amount of replenisher is reduced.

Another means of reducing the amount of replenisher involves controlling the bromide ion concentration in the replenisher. Where a silver halide color photographic material is processed with a color developer, halide ions are released from the material into the color developer. In a low-replenishment processing system, in particular, the bromide ion concentration in the color developer increases over time with the progress of the processing procedure, whereby the color development is inconveniently retarded. Therefore, to prevent this phenomenon, the bromide ion concentration in the replenisher to be used in the low-replenishment processing system is adjusted to a lower value than would be the case for a replenisher for use in a general processing system.

Recently, the demand has increased for silver halide color photographic materials, especially picture-taking ones, having a high sensitivity, a high sharpness and an excellent color reproducibility, such as ISO 400 photographic materials (Super HG-400 made by Fuji Photo Film Co., Ltd.) having a high image quality comparable to that of ISO 100 photographic materials.

A known means of improving the sharpness and color reproducibility of photographic materials is to incorporate a so-called DIR coupler into the material Recently, compounds capable of improving the capacity of such DIR couplers have been proposed in JP-A-60-185950. By incorporation of such a compound, the sharpness and color reproducibility of the resulting photographic materials may be improved. However, it has been found that the photographic properties of the materials vary with the fatigue of the color developer used. The combination of the above-mentioned compound and a so-called DIR compound has been proposed in JP-A-61-255342, and other recent JP-A applications, for example, JP-A-1-107256, JP-A-1-259359, JP-A-1-269935 and JP-A-2-28637 also illustrate the combination of the above-mentioned compound and a so-called DIR compound. However, it has been found that these photographic materials still have insufficient sharpness and color reproducibility, and cannot be processed satisfactorily by conventional continuous processing methods which are generally carried out in local laboratories. This is because, where the materials are processed by a conventional continuous method in which a color developer replenisher is added to the processing bath, the color developer is highly activated or on the contrary deactivated and, as a result, the properties of the processed photographic materials are neither stable nor constant.

Hydrolyzable DIR couplers and compounds, which may improve the sharpness and color reproducibility of photographic materials without causing fluctuation of the activity of the color developer used, have been proposed in JP-A-57-151944, JP-A-58-205150, JP-A-1-210953, JP-A-1-280755 and U.S. Pat. No. 4,782,012. Specifically, the proposed DIR couplers and DIR compounds release a group in which the development inhibitor moiety is hydrolyzed in a color developer and substantially loses its development inhibiting activity. Using such hydrolyzable DIR couplers or compounds of that type, fluctuation of the activity of the color developer used may be overcome.

However, it has been found that among the proposed DIR couplers and compounds, those which release an aryloxy ion by deactivation of the development inhibitor moiety thereof in a color developer are defective, since the released aryloxy ions are taken up in the oil drops of the coupler in the photographic material being processed, causing the coupling activity of the coupler to vary. As a result, the properties of the processed photographic material fluctuate. In particular, when the reduction in the amount of replenisher added to the color developer is large, the fluctuation of the properties of the processed photographic material is also large. It has also been found that incorporation of such DIR couplers and compounds often causes bleaching fog during processing, as well as yellow stains in the processed photographic materials after the materials are stored for a long period of time.

In the present situation, although low-replenishment processing systems provide a simple and convenient means for reducing the amount of waste liquids from the photographic process, great reductions in the amount of color developer replenisher have not been adopted in the industry because of the above-mentioned problems.

SUMMARY OF THE INVENTION

Accordingly, an object of the present invention is to provide a method of processing a silver halide color photographic material, which may be carried out continuously and with a noticeable reduction in the amount of replenisher added to the color developer, to give a processed photographic material having stable photographic properties.

Another object of the present invention is to provide such a method in which the photographic material which is processed is free from bleaching fog and hardly shows yellow stains even after it is stored for a long period of time.

This and other objects of the invention have been attained by a method of processing a silver halide color photographic material comprising a support having provided thereon at least one light-sensitive emulsion layer, which comprises the steps of color developing the material with a color developer to which a replenisher is added and bleaching the developed material, wherein the material contains a coupler represented by the following general formula (I) and the amount of replenisher added to the color developer is 600 ml or less per $m^2$ of the material:

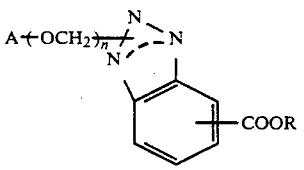

(I)

wherein A represents a coupler group, and when A is a phenol or naphthol coupler group, n is 1, and when A is any other coupler group, n is 0; and R represents an alkyl group having from 1 to 4 carbon atoms, or a pyridyl group.

DETAILED DESCRIPTION OF THE INVENTION

In the method of the present invention, the amount of replenisher added to the color developer is 600 ml or less per $m^2$ of the photographic material being processed. It is preferably from 100 ml to 500 ml, more preferably from 100 ml to 400 ml, and especially preferably from 100 ml to 300 ml, per $m^2$ of the material for the purpose of attaining the effects of the invention more remarkably.

With reference to formula (I), A therein is explained in more detail below.

For example, A may be a yellow coupler group (for example, an open-chain ketomethylene group), a magenta coupler group (for example, a 5-pyrazolone, pyrazoloimidazole or pyrazolotriazole group), a cyan coupler group (for example, a phenol or naphthol group), or a colorless coupler group (for example, an indanone or acetophenone group). Additionally, A may further include heterocyclic coupler groups as described in U.S. Pat. Nos. 4,315,070, 4,183,752, 3,961,959 and 4,171,223.

Preferred examples of A are coupler groups of the following formulae (Cp-1), (Cp-2), (Cp-3), (Cp-4), (Cp-5), (Cp-6), (Cp-7), (Cp-8), (Cp-9) and (Cp-10). These are preferred as having a high coupling rate.

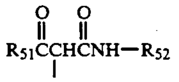

(Cp-1)

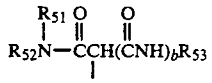

(Cp-2)

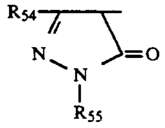

(Cp-3)

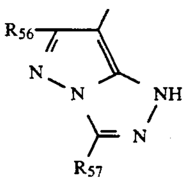

(Cp-4)

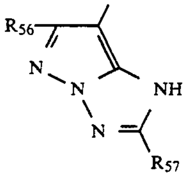

(Cp-5)

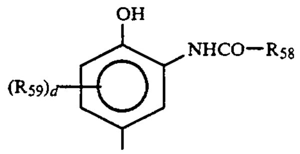

(Cp-6)

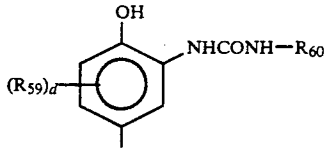

(Cp-7)

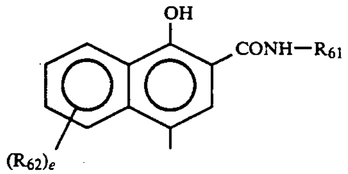

(Cp-8)

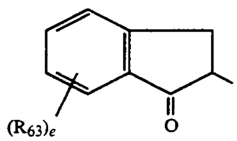

(Cp-9)

-continued

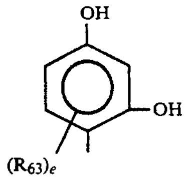

(Cp-10)

In the above formulae, the free bond indicates the position to which a coupling split-off group is bonded.

In these formulae, where the substituent $R_{51}$, $R_2$, $R_{53}$, $R_{54}$, $R_{55}$, $R_{56}$, $R_{57}$, $R_{58}$, $R_{59}$, $R_{60}$, $R_{61}$, $R_{62}$, or $R_{63}$ contains a non-diffusive group, the substituent is so selected that the total number of carbon atoms therein is from 8 to 40, preferably from 10 to 30. In the other cases, the total number of carbon atoms in the substituent is preferably 15 or less. Where the formulae are derived from bis-type, telomer-type or polymer-type couplers, any one or more of the above-mentioned substituents may be divalent groups to which repeating units are bonded. In the polymer-type or the like cases, the above-defined ranges of the number of carbon atoms in the substituents may be neglected.

Next, $R_{51}$ to $R_{63}$, b, d and e are explained in detail below. In the following description, $R_{41}$ represents an aliphatic group, an aromatic group or a heterocyclic group; $R_{42}$ represents an aromatic group or a heterocyclic group; and $R_{43}$, $R_{44}$ and $R_{45}$ each represents a hydrogen atom, an aliphatic group, an aromatic group or a heterocyclic group.

$R_{51}$ has the same meaning as $R_{41}$. b represents 0 or 1. $R_{52}$ and $R_{53}$ each have the same meaning as $R_{42}$. $R_{54}$ has the same meaning as $R_{41}$ or it represents $R_{41}CON(R_{43})$—, $R_{41}N(R_{43})$—, $R_{41}SO_2N(R_{43})$—, $R_{41}S$—, $R_{43}O$—, $R_{45}N(R_{43})CON(R_{44})$—, or NC—. $R_{55}$ has the same meaning as $R_{41}$. $R_{56}$ and $R_{57}$ each have the same meaning as $R_{43}$ or represent $R_{41}S$—, $R_{43}O$—, $R_{41}CON(R_{43})$—, or $R_{41}SO_2N(R_{43})$—. $R_{58}$ has the same meaning as $R_{41}$.

$R_{59}$ has the same meaning as $R_{41}$ or represents $R_{41}CON(R_{43})$—, $R_{41}OCON(R_{43})$—, $R_{41}SO_2N(R_{43})$—, $R_{43}N(R_{44})CON(R_{45})$—, $R_{41}O$—, $R_{41}S$—, a halogen atom, or $R_{41}N(R_{43})$—. d represents from 0 to 3. Where d is a plural number, the plural $R_{59}$'s may be same substituents or different substituents, or they may be divalent groups which bond to each other to form a cyclic structure. As examples of divalent groups for forming such a cyclic structure, there are typically mentioned the following groups (a) and (b)

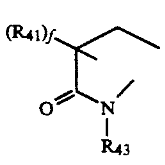

(a)

and

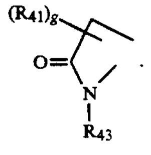

(b)

In these groups (a) and (b), f represents an integer of from 0 to 4; and g represents an integer of from 0 to 2.

$R_{60}$ has the same meaning as $R_{41}$.

$R_{61}$ has the same meaning as $R_{41}$.

$R_{62}$ has the same meaning as $R_{41}$ or represents $R_{41}OCONH$—, $R_{41}CONH$—, $R_{41}SO_2NH$—, $R_{43}N(R_{44})CON(R_{45})$—, $R_{43}N(R_{44})SO_2N(R_{45})$—, $R_{43}O$—, $R_{41}S$—, a halogen atom, or $R_{41}N(R_{43})$—. $R_{63}$ has the Same meaning as $R_{41}$ or represents $R_{43}CON(R_{43})$—, $R_{43}N(R_{44})CO$—, $R_{41}SO_2N(R_{44}$ $R_{43}N$ $R_{44})SO_2$—, $R_{41}SO_2$—, $R_{43}OCO$—, $R_{43}O$ —$SO_2$—, a halogen atom, a nitro group, a cyano group, or $R_{43}CO$—. e represents an integer of from 0 to 4. Where a group has plural $R_{62}$'s or $R_{63}$'s, they may be the same or different.

An aliphatic group as referred to herein means a saturated or unsaturated, non-cyclic or cyclic, linear or branched, and substituted or unsubstituted aliphatic hydrocarbon group. Specific examples of such groups include methyl, ethyl, propyl, isopropyl, butyl, (t)-butyl, (i)-butyl, (t)-amyl, hexyl, cyclohexyl, 2-ethylhexyl, octyl, 1,1,3,3-tetramethylbutyl, decyl, dodecyl, hexadecyl and octadecyl groups.

An aromatic group as referred to herein has from 6 to 20 carbon atoms and is preferably a substituted or unsubstituted phenyl group, or a substituted or unsubstituted naphthyl group.

A heterocyclic group as referred to herein means a substituted or unsubstituted, preferably 3-membered to 8-membered heterocyclic group, having from 1 to 20 carbon atoms, preferably from 1 to 7 carbon atoms and having one or more hereto atoms selected from nitrogen, oxygen and sulfur atoms. Specific examples of such heterocyclic groups are 2-pyridyl, 2-thienyl, 2-furyl, 1,3,4-thiadiazol-2-yl, 2,4-dioxo-1,3-imidazolidin-5-yl, 1,2,4-triazol-2-yl and 1-pyrazolyl groups.

The above-mentioned aliphatic hydrocarbon, aromatic and heterocyclic groups may be substituted. Specific examples of substituents for the groups are a halogen atom, $R_{47}O$—, $R_{46}S$—, $R_{47}CON(R_{48}$— $R_{47}N(R_{48})CO$—, $R_{46}OCON(R_{47})$—, $R_{46}SO_2N$ $R_{47})$—, $R_{47}N$ $R_{48})SO_2$—, $R_{46}SO_2$—, $R_{47}OCO$—, $R_{47}N(R_{48})CON(R_{49})$—, $R_{46}$—,

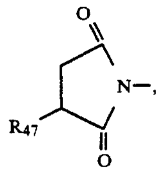

$R_{46}COO$—, $R_{47}OSO_2$—, a cyano group and a nitro group. $R_{46}$ represents an aliphatic group, an aromatic group, or a heterocyclic group; and $R_{47}$, $R_{48}$ and $R_{49}$ each represents an aliphatic group, an aromatic group, a heterocyclic group, or a hydrogen atom. The aliphatic group, aromatic group and heterocyclic group have the same meanings as defined above.

Next, preferred ranges of $R_{51}$ to $R_{63}$ and d and e will be mentioned below.

$R_{51}$ is preferably an aliphatic group or an aromatic group in formula (Cp-1), and it is preferably a hydrogen atom or an aliphatic group in formula (Cp-2).

$R_{52}$, $R_{53}$ and $R_{55}$ each are preferably a heterocyclic group or an aromatic group.

$R_{54}$ is preferably $R_{41}CONH$— or $R_{41}$—$N(R_{43})$—. $R_{56}$ and $R_{57}$ each are preferably an aliphatic group, an aromatic group, $R_{41}O$—, or $R_{41}S$—. $R_{58}$ is preferably an aliphatic group or an aromatic group. In formula (Cp-6), $R_{59}$ is preferably a chlorine atom, an aliphatic group or $R_{41}CONH$—, and d is preferably 1 or 2. $R_{60}$ is preferably an aromatic group. In formula (Cp-7), $R_{59}$ is preferably $R_{41}CONH$—. In formula (Cp-7), d is preferably 1 (one). $R_{61}$ is preferably an aliphatic group or an aromatic group. In formula (Cp-8), e is preferably 0 or 1. $R_{62}$ is preferably $R_{41}OCONH$—, $R_{41}CONH$— or $R_{41}SO_2NH$—, which is substituted at the 5-position of the naphthol ring. In formula (Cp-9), $R_{63}$ is preferably $R_{41}CONH$—, $R_{41}SO_2NH$—, $R_{41}N(R_{43})SO_2$—, $R_{41}SO_2$—, $R_{41}N(R_{43})CO$—, a nitro group or a cyano group.

In formula (Cp-10), $R_{63}$ is preferably $R_{43}N(R_{44})CO$—, $R_{43}OCO$— or $R_{43}CO$—.

In formula (I), the R group is explained in detail below.

When R represents an alkyl group, it is a linear or branched and substituted or unsubstituted alkyl group having from 1 to 4 carbon atoms, preferably from 1 to 3 carbon atoms.

When R represents a pyridyl group, it is a substituted or unsubstituted 2—, 3- or 4-pyridyl group.

When R represents an alkyl group, it is preferably a substituted alkyl group. Preferred examples of substituents in the substituted alkyl group include an alkoxycarbonyl group (having from 2 to 6 carbon atoms, such as methoxycarbonyl, propoxycarbonyl, butoxycarbonyl, isobutoxycarbonyl, isopropoxycarbonyl, pentyloxycarbonyl, isopentyloxycarbonyl, 2-methoxyethoxycarbonyl), a carbamoyl group (having from 0 to 6 carbon atoms, such as N,N-diethylcarbamoyl, N-methyl-N-ethylcarbamoyl, pyrrolidinocarbonyl, piperidinocarbonyl), a halogen atom (e.g., chlorine, fluorine), a nitro group, a cyano group, an alkoxy group (having from 1 to 4 carbon atoms, such as methoxy, ethoxy, methoxyethoxy), a sulfamoyl group (having from 0 to 6 carbon atoms, such as N,N-diethylsulfamoyl, N-methyl-N-ethylsulfamoyl), an aryloxy group (having from 6 to 10 carbon atoms, such as 4-chlorophenoxy), an acyl group (having from 2 to 6 carbon atoms, such as acetyl, benzoyl), a sulfonyl group (having from 1 to 6 carbon atoms, such as methanesulfonyl, butanesulfonyl), a heterocyclic group (a 3 to 6-membered heterocyclic group having from 1 to 5 carbon atoms and having one or more heteto atoms selected from nitrogen, oxygen and sulfur atoms, such as 2-pyridyl, 3-pyridyl), and a phosphoryl group (having from 2 to 5 carbon atoms, such as O,O-diethylphosphoryl). An alkoxycarbonyl group and a carbamoyl group are especially preferred.

When R represents a pyridyl group, it may be substituted. Preferred examples of substituents in the substituted pyridyl group include, in addition to those mentioned as substituents for the above-mentioned alkyl group, an aliphatic group (having from 1 to 6 carbon atoms, such as methyl, ethyl).

Specific examples of the group R are given below:

$-CH_2COOC_3H_7$, $-CH_2COOC_4H_9$, $-CH_2COOC_3H_7(i)$, $-CH_2COOC_4H_9(i)$, $-CH_2COOC_5H_{11}$, $-CH_2COOC_5H_{11}(i)$, $-CH_2COOC_5H_{11}(t)$, $-CH_2CH_2COOC_3H_7$, $-CH_2CH_2COOC_3H_7(i)$, $-CH_2CH_2CH_2COOCH_3$, 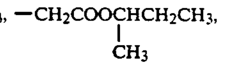,

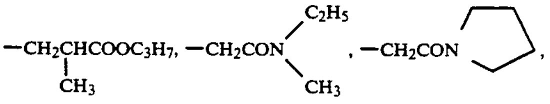

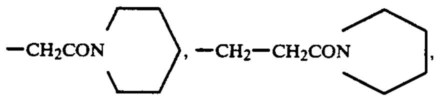

$-CH_2CONHC_4H_9$, $-CH_2CONHC_5H_{11}$, $-CH_2CONHC_4H_9(i)$, $-CH_2CHCl_2$, $-CH_2CF_3$, $-CH_2CF_2CF_3$,

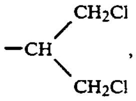, $-C_3H_7$, $-C_4H_9$, $-CH_2CH_2OC_2H_5$,

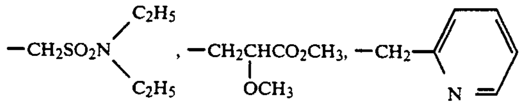

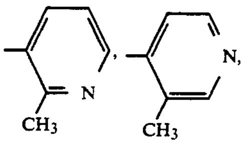, $CH_2CH_2NO_2$,

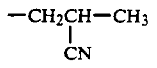

Next, specific examples of couplers of formula (I) for use in the present invention are given below. These examples are not limitative. In the following formulae, the expression

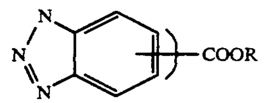

means a mixture of

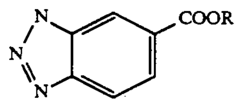 and 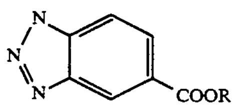

-continued
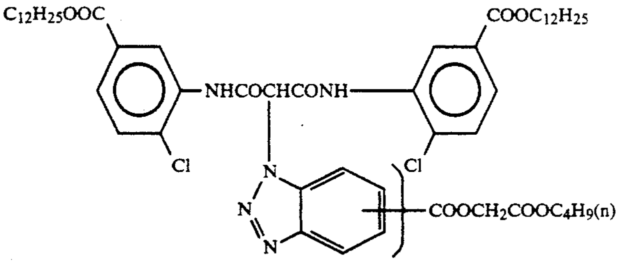
(D-1)
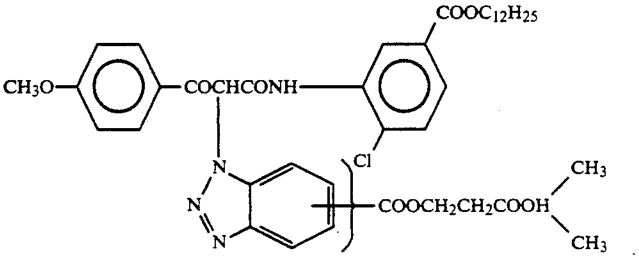
(D-2)
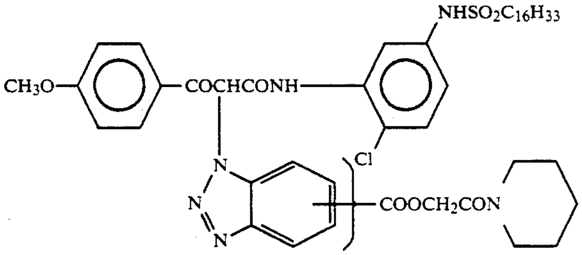
(D-3)
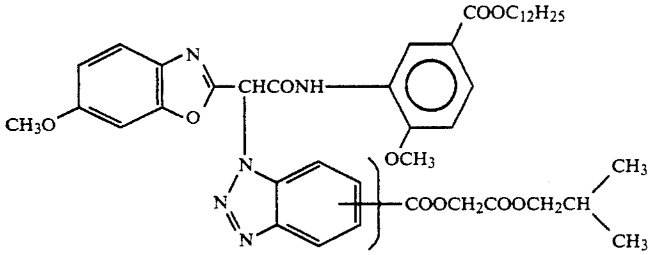
(D-4)
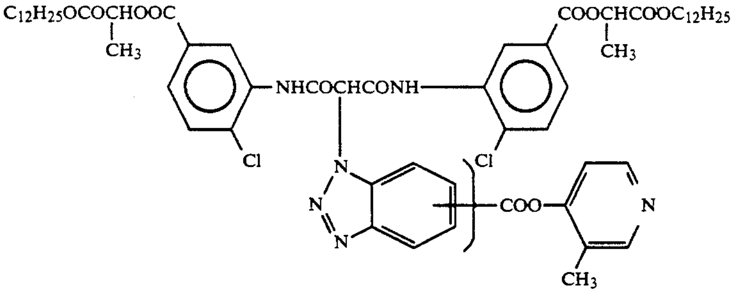
(D-5)
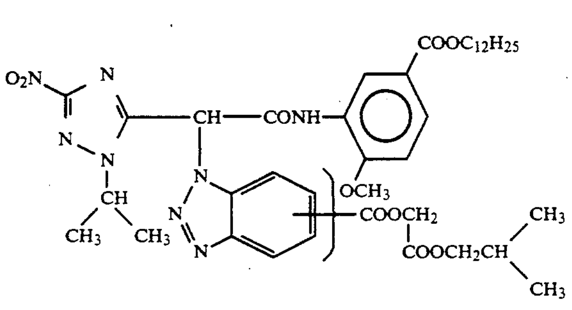
(D-6)

-continued
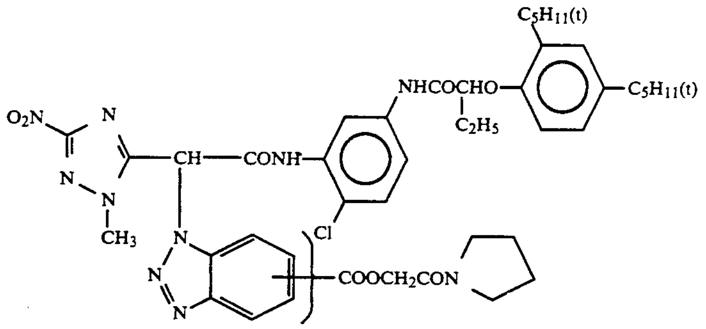
(D-7)
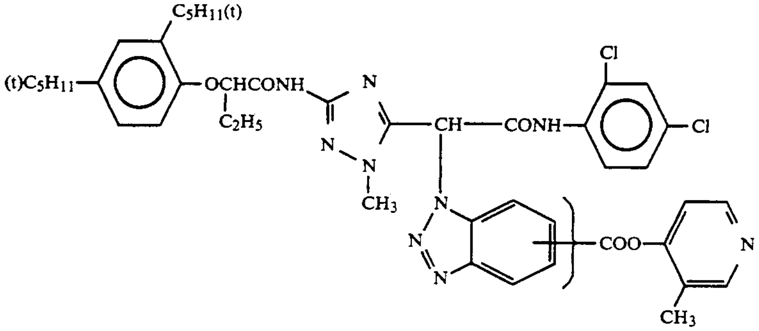
(D-8)
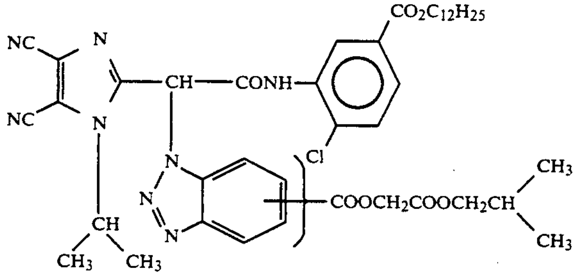
(D-9)
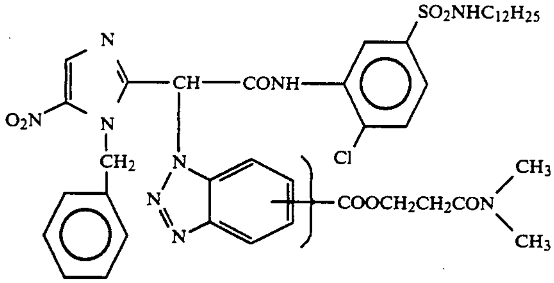
(D-10)
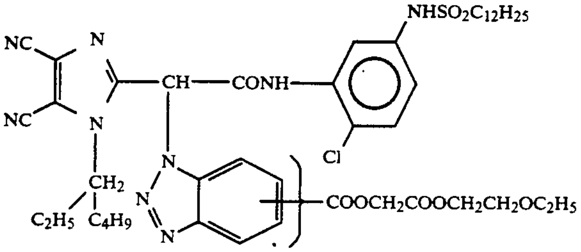
(D-11)

-continued
(D-12)
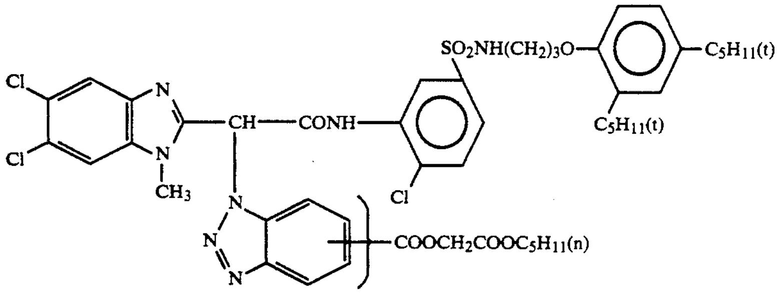
(D-13)
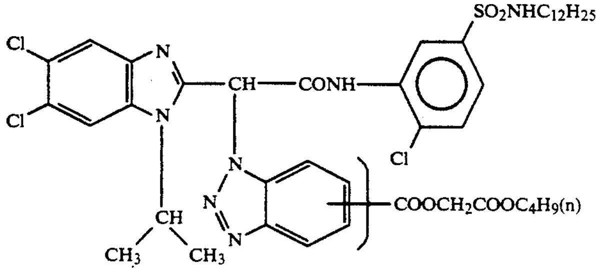
(D-14)
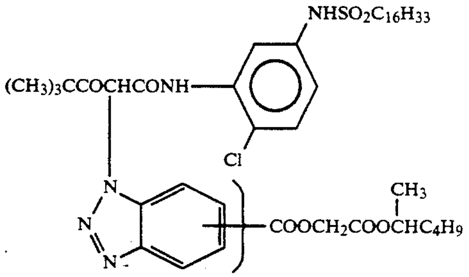
(D-15)
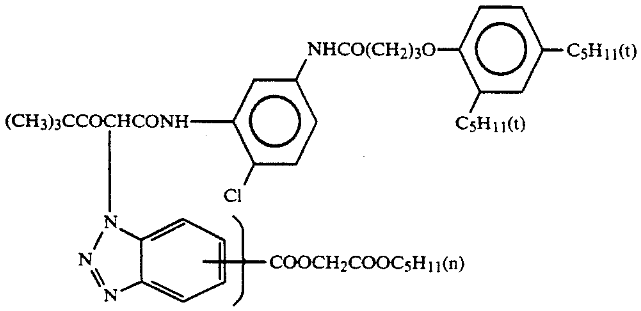
(D-16)
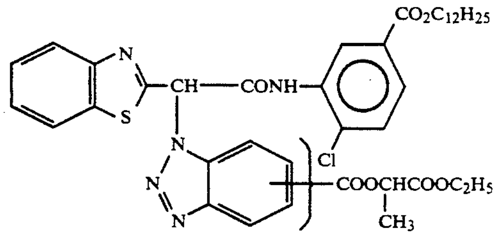
(D-17)
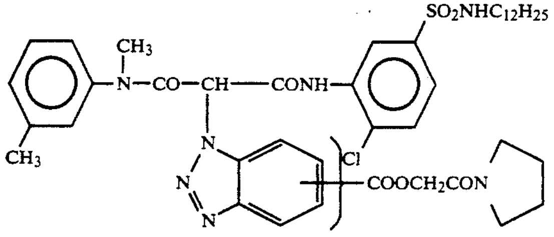

-continued
(D-18)
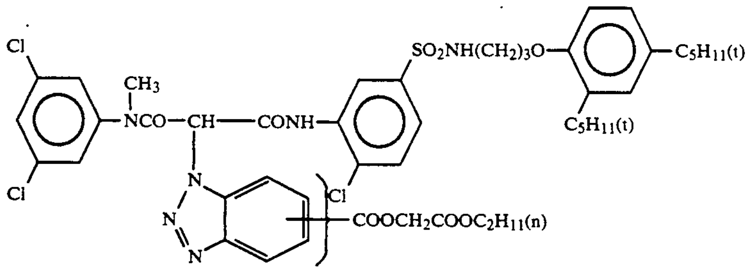
(D-19)
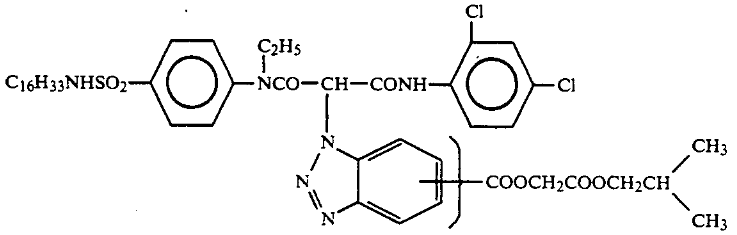
(D-20)
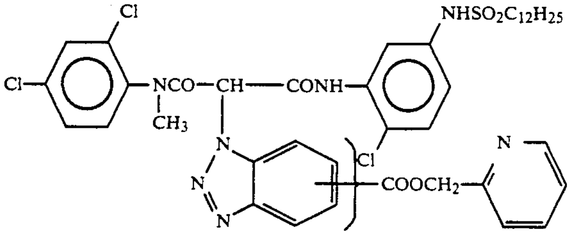
(D-21)
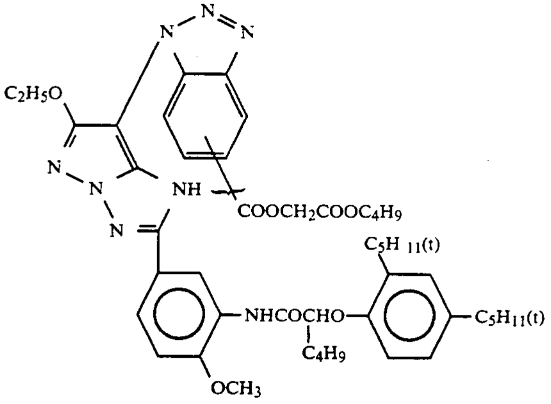
(D-22)
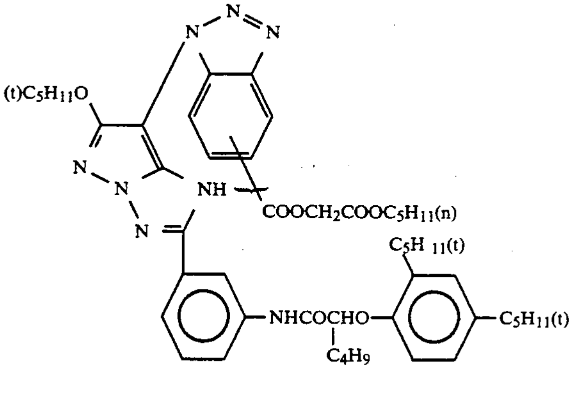

-continued
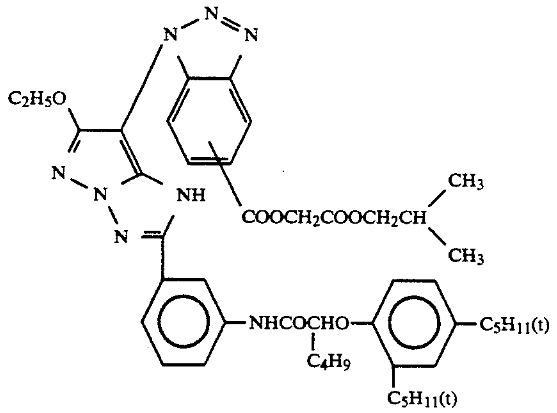
(D-23)
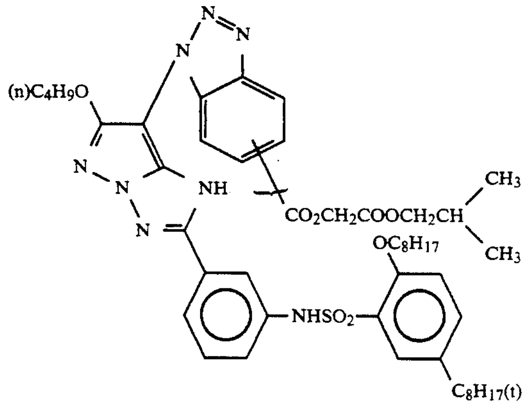
(D-24)
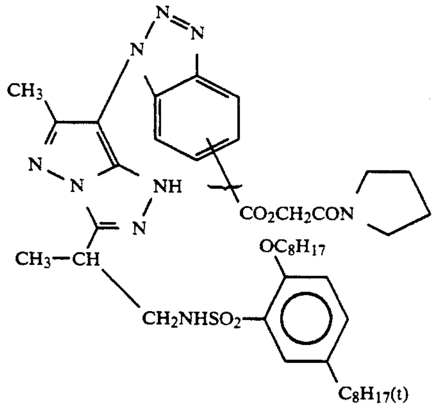
(D-25)
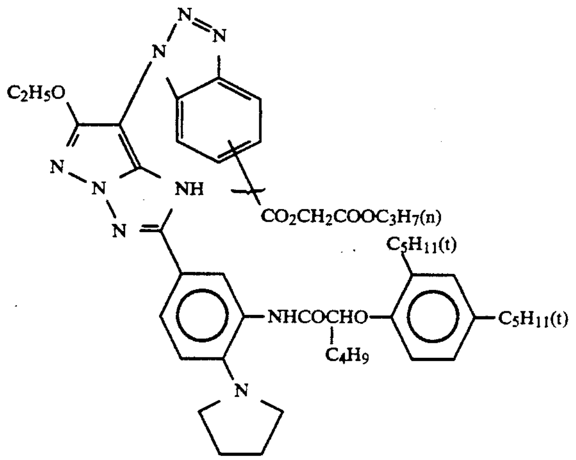
(D-26)

-continued
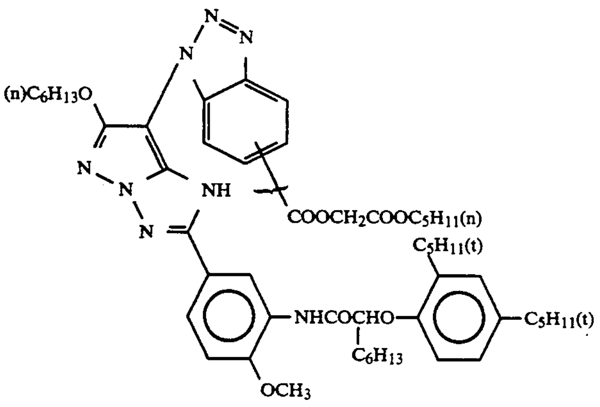
(D-27)
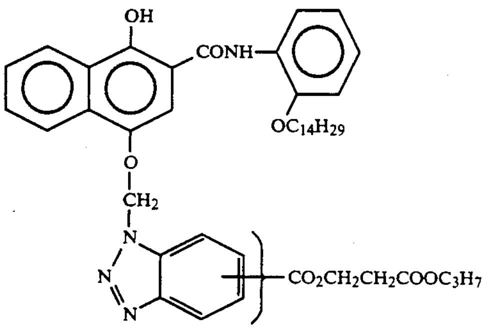
(D-28)
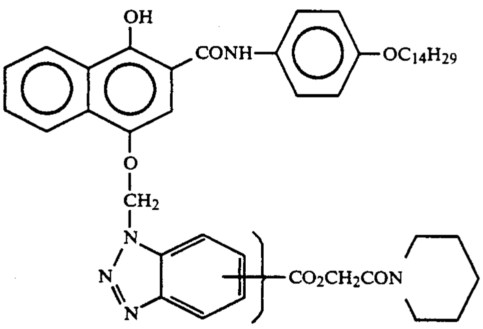
(D-29)
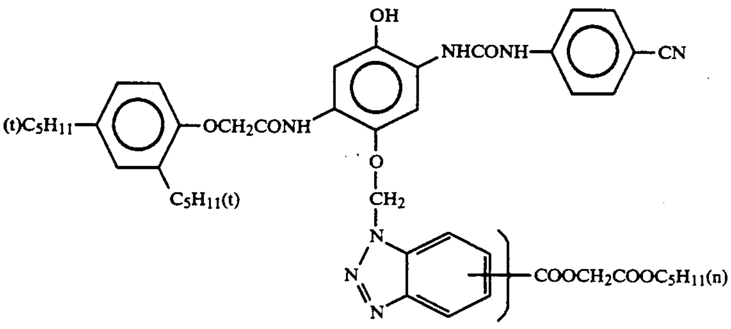
(D-30)

-continued
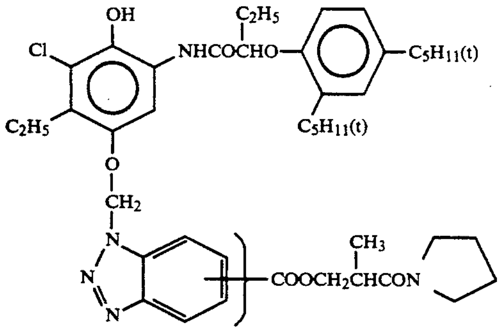
(D-31)
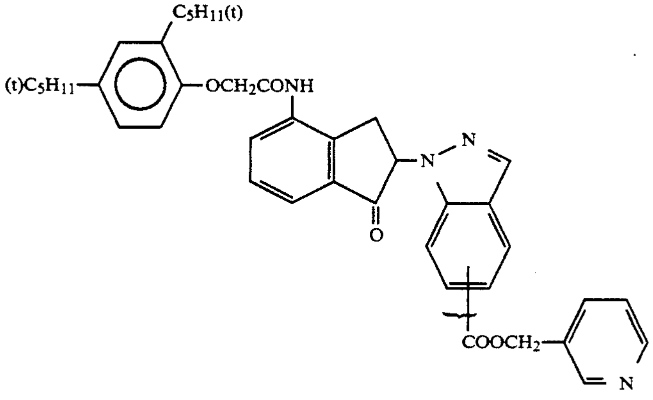
(D-32)
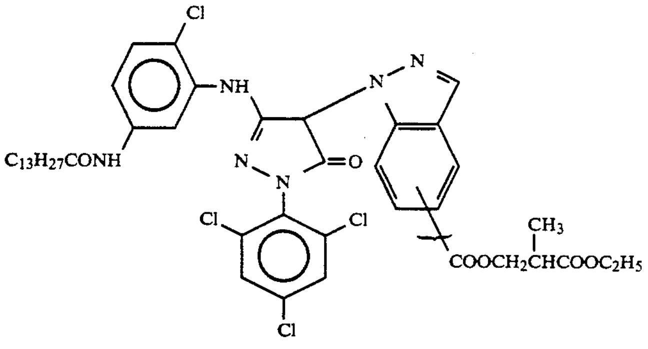
(D-33)
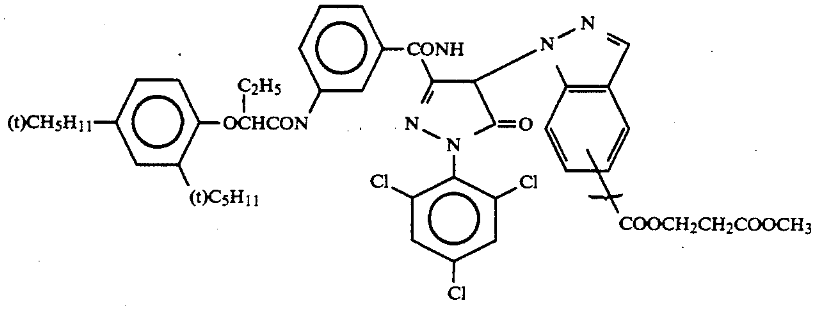
(D-34)

-continued
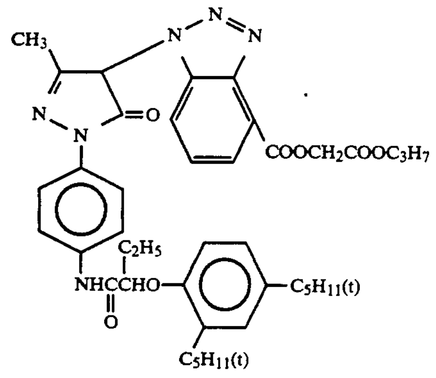
(D-35)
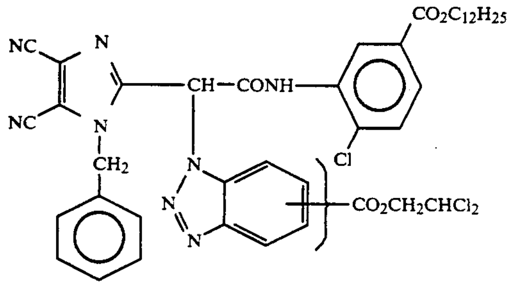
(D-36)
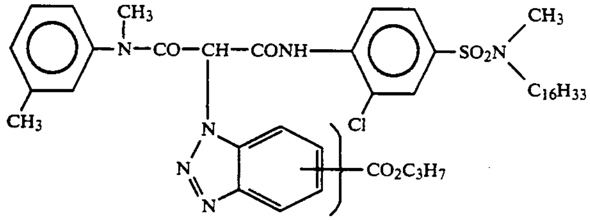
(D-37)
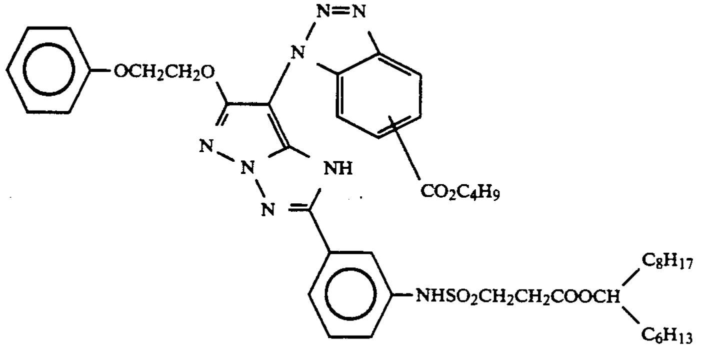
(D-38)

-continued (D-39)

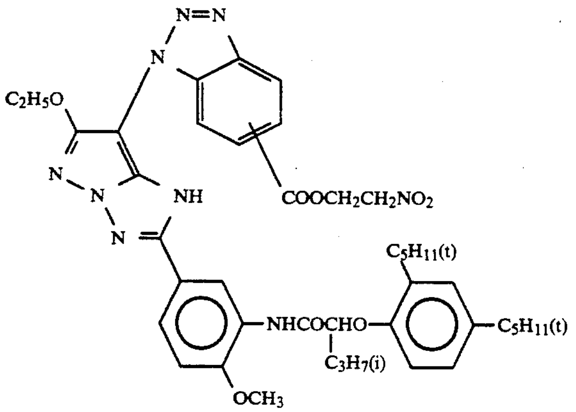

Compounds of formula (I) for use in the present invention can be produced by any known method. For instance, they may be produced by the methods described in JP-A-57-151944, EP 336411A and EP320939A.

Next, synthesis examples for compounds of formula (I) are given below.

SYNTHESIS EXAMPLE 1

Synthesis of Compound (D-1)

Compound (D-1) was synthesized in accordance with the route shown below.

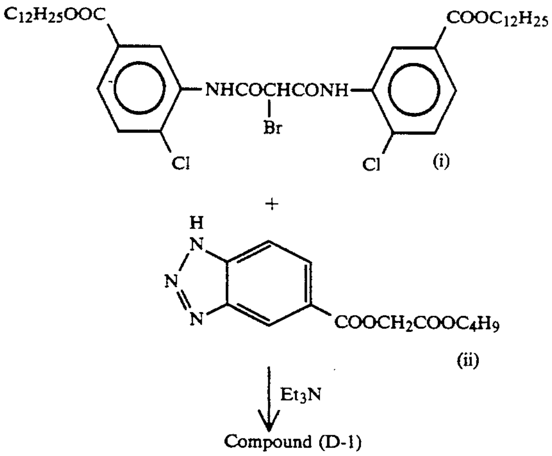

Specifically, 13.5 g of compound (ii) and 4.9 g of triethylamine were added to 200 ml of N,N-dimethylformamide and stirred at room temperature for 15 minutes. To the resulting solution was added 20 g of compound (i), and the whole was stirred for 3 hours at room temperature. 500 ml of ethyl acetate were added to the reaction mixture, which was then transferred to a separating funnel and washed with water. The oil layer thus separated was taken out and washed with a diluted hydrochloric acid and then with water. The resulting oil layer was isolated, and the solvent was removed therefrom by distillation under reduced pressure. 100 ml of a mixed solvent of ethyl acetate and hexane were added to the residue, and the crystals thus crystallized out were taken out by filtration yielding 15.3 g of Compound (D-1).

SYNTHESIS EXAMPLE 2

Synthesis of Compound (D-6)

Compound (D-6) was synthesized in accordance with the route shown below.

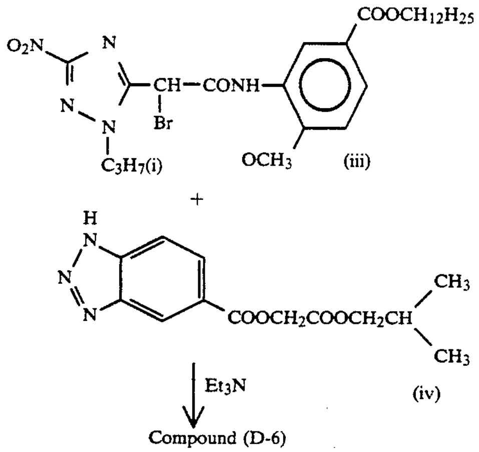

Specifically, the reactants were reacted in the same manner as in Synthesis Example 1, except that an equivalent amount of compound (iv) was used in place of compound (ii) in Synthesis Example 1 and 14.8 g of compound (iii) was used in place of compound (i). Accordingly, 8.5 g of Compound (D-6) was obtained after crystallization with a mixed solvent of isopropanol and hexane.

SYNTHESIS EXAMPLE 3

Synthesis of Compound (D-8)

Compound (D-8) was synthesized in accordance with the route shown below.

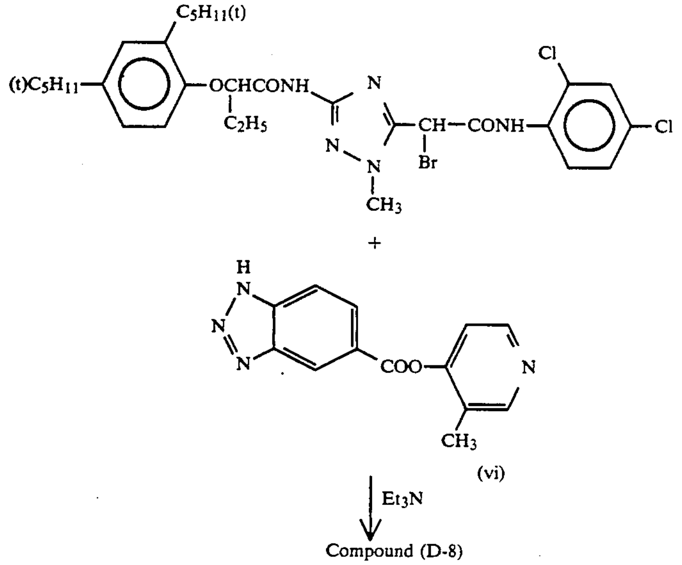

Compound (D-8)

Specifically, the reactants were reacted in the same manner as in Synthesis Example 1, except that 16.5 g of compound (v) was used in place of compound (i) in Synthesis Example 1 and 12.3 g of compound (iv) was used in place of compound (ii). Accordingly, 9.8 g of Compound (D-8) was obtained after crystallization with a mixed solvent of ethyl acetate and hexane.

SYNTHESIS EXAMPLE 4

Synthesis of Compound (D-9)

Compound (D-9) was synthesized in accordance with the route shown below.

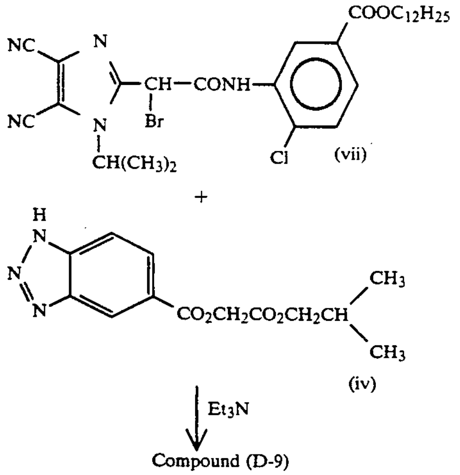

Compound (D-9)

Specifically, the reactants were reacted in the same manner as in Synthesis Example 2, except that 15.0 g of compound (vii) was used in place of compound (iii) in Synthesis Example 2. Accordingly, 12.1 g of Compound (D-9) was obtained.

SYNTHESIS EXAMPLE 5

Synthesis of Compound (D-17)

Compound (D-17) was synthesized in accordance with the route shown below.

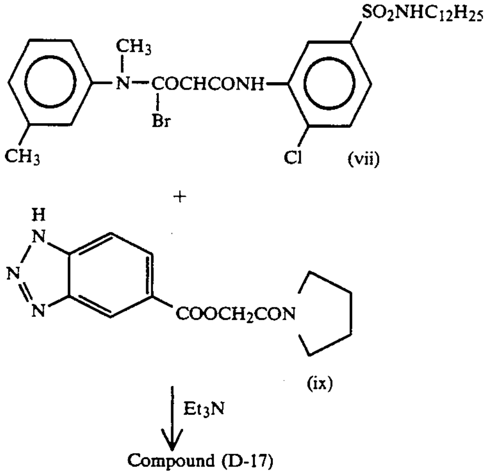

Compound (D-17)

Specifically, 17.1 g of compound (ix) and 6 g of triethylamine were added to 200 ml of N,N-dimethylacetamide and stirred for 15 minutes. To the resulting solution was dropwise added a solution of 20 g of compound (viii) as dissolved in 100 ml of chloroform at room temperature, over a period of 20 minutes. The reactants were reacted for 3 hours at room temperature and then for 30 minutes at 40° C. Then, the reaction mixture was processed in the same manner as in Synthesis Example 1. After crystallization from a mixed solvent of ethyl acetate and hexane, 15.3 g of the product of Compound (D-17) was obtained.

SYNTHESIS EXAMPLE 6

Synthesis of Compound (D-23)

Compound (D-23) was synthesized in accordance with the route shown below.

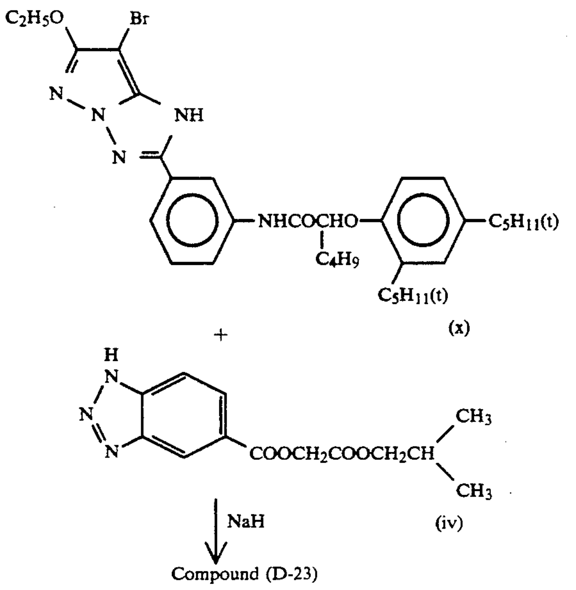

(x)

(iv)

Compound (D-23)

Specifically, 25.5 g of compound (iv) was dissolved in 100 ml of N,N'-dimethyl-2-imidazolidinone and cooled with ice. 3.7 g of sodium hydride (60 %) was added to the resulting solution and then stirred for 20 minutes. 20 g of compound (x) was added to the solution and reacted at room temperature for 5 hours and then heated up to 50° C. and stirred at that temperature for 1.5 hours. After reaction, the reaction mixture was returned back to room temperature, and 200 ml of ethyl acetate and 200 ml of water were added thereto. The resulting mixture was then transferred to a separating funnel. The oil layer thus separated was taken out and washed first with water, then with a diluted hydrochloric acid and again with water. The resulting oil layer was isolated and the solvent was removed therefrom by distillation under reduced pressure. Ethyl acetate and hexane were added to the resulting residue, and the crystals thus crystallized out were taken out by filtration. Accordingly, 15.5 g of the product of Compound (D-23) was obtained.

Couplers of formula (I) of the present invention may be incorporated into any of the layers constituting the photographic material of the invention, but they are desirably added to the light-sensitive silver halide emulsion layers and/or adjacent layers thereof. More preferably, they are added to the light-sensitive silver halide emulsion layers constituting the photographic material. Where one light-sensitive emulsion layer having the same color sensitivity is composed of two or more sublayers each having a different sensitivity degree in the photographic material to be processed by the method of the present invention, couplers of formula (I) are especially desirably incorporated into layers others than the layer having the highest color sensitivity.

The total amount of couplers of formula (I) to be incorporated in the photographic material of the invention is generally from $3\times10^{-7}$ to $1\times10^{-3}$ mol/m$^2$, preferably from $3\times10^{-6}$ to $5\times10^{-4}$ mol/m$^2$, more preferably from $1\times10^{-5}$ to $2\times10^{-4}$ mol/m$^2$.

Couplers of formula (I) of the present invention may be added to photographic materials in the same manner as general couplers are added, as will be discussed subsequently.

Below, the processing method of the present invention is explained in detail.

In accordance with the method of the present invention of processing the silver halide color photographic material mentioned above, the material is imagewise exposed, then color developed and thereafter bleached.

The color developer used for carrying out the method of the present invention may contain any known aromatic primary amine color developing agent. Preferred examples of color developing agents usable in the present invention are p-phenylenediamine compounds, and specific examples of such compounds are given below. However, these are not limitative.

D-1: N,N-diethyl-p-phenylenediamine
D-2: 2-Amino-5-diethylaminotoluene
D-3: 2-Amino-5-(N-ethyl-N-laurylamino)toluene
D-4: 4-[N-ethyl-N-(8-hydroxyethyl)amino]aniline
D-5: 2-Methyl-4-[N-ethyl-N-(β-hydroxyethyl-)amino]aniline
D-6: 4-Amino-3-methyl-N-ethyl-N-β-(methanesulfonamido)-ethyl]-aniline
D-7: N-(2-amino-5-diethylaminophenylethyl)methanesulfonamide
D-8: N,N-dimethyl-p-phenylenediamine
D-9: 4-Amino-3-methyl-N-ethyl-N-methoxyethylaniline
D-10: 4-Amino-3-methyl-N-ethyl-N-8-ethoxyethylaniline
D-11: 4-Amino-3-methyl-N-ethyl-N-8-butoxyethylaniline Of the above-mentioned p-phenylenediamine compounds, Compound (D-5) is especially preferred.

These p-phenylenediamine compounds may also be in the form of salts, such as sulfates, hydrochlorides, sulfites, and p-toluenesulfonates of the derivatives. The amount of the aromatic primary amine color developing agent in the color developer may be from 0.001 to 0.1 mol, more preferably from 0.01 to 0.06 mol, per liter of the color developer.

The color developer may contain, if desired, a sulfite such as sodium sulfite, potassium sulfite, sodium bisulfite, potassium bisulfite, sodium metasulfite or potassium metasulfite, as well as a carbonyl-sulfite adduct, as a preservative.

If a preservative is used, the amount of the preservative in the color developer is preferably from 0.5 to 10 g, more preferably from 1 to 5 g, per liter of color developer.

Compounds capable of directly preserving the above-mentioned aromatic primary amine color developing agents include various hydroxylamines (for example, those described in JP-A-63-5341 and 63-106655, especially those having a sulfo group or a carboxyl group among them), the hydroxamic acids described in JP-A-63-43138, the hydrazines and hydrazides described in JP-A-63-146041, the phenols described in JP-A-63-44657 and JP-A-63-58443, the α-hydroxyketones and o-aminoketones described in JP-A-63-44656, and various saccharides as described in JP-A-63-36244. At least one of these direct preservative compounds is preferably added to the color developer, but their use is not essential. If a direct preservative compound is used, it is preferred to also add to the color developer monoamines as described in JP-A-63-4235, JP-A-63-24254, JP-A-63-21647, JP-A-63-146040, JP-A-63-27841 and JP-A-63-25654, diamines as described in JP-A-63-30845, JP-A-63-14640 and JP-A-63-43139, polyamides as described in JP-A-63-63-21647, JP-A-63-26655 and JP-A-

63-44655, nitroxy radicals as described in JP-A-63-53551, alcohols as described in JP-A-63-43140 and JP-A-63-53549, oximes as described in JP-A-63-56654, or tertiary amines as described in JP-A-63-239447.

Other preservatives which may be added to the color developer for use in the present invention include various metal compounds described in JP-A-57-44148 and JP-A-57-53749, salicylic acids described in JP-A-59-180588, alkanolamines described in JP-A-54-3582, polyethylene imines described in JP-A-56-94349, and aromatic polyhydroxy compounds described in U.S. Pat. 3,746,544. These may optionally be added to the color developer, if desired. In particular, addition of aromatic polyhydroxy compounds is preferred.

The color developer for use in the present invention preferably has a pH value of from 9 to 12, more preferably from 9 to 11.0, and it may contain any other compound which is known as a component constituting a developer.

Various buffers are preferably added to the developer to maintain the above-mentioned pH range.

Examples of buffers to be used for this purpose include sodium carbonate, potassium carbonate, sodium bicarbonate, potassium bicarbonate, triisodium phosphate, tripotassium phosphate, disodium phosphate, dipotassium phosphate, sodium borate, potassium borate, sodium tetraborate (borax), potassium tetraborate, sodium o-hydroxybenzoate (sodium salicylate), potassium o-hydroxybenzoate, sodium 5-sulfo-2-hydroxybenzoate (sodium 5-sulfosalicylate), and potassium 5-sulfo-2-hydroxybenzoate (potassium 5-sulfosalicylate). However, these compounds are not limitative.

The amount of the buffer added to the color developer is preferably 0.1 mol/liter or more, especially preferably from 0.1 to 0.4 mol/liter.

In addition, the color developer may further contain various chelating agents as precipitation inhibitors for inhibiting precipitation of calcium or magnesium in the color developer or for the purpose of improving the stability of the developer.

The preferred chelating agents are organic acid compounds such as aminopolycarboxylic acids, organic phosphonic acids and phosphonocarboxylic acids. Specific examples include nitrilotriacetic acid, diethylenetriamine-pentaacetic acid, ethylenediaminetetraacetic acid, N,N,N-trimethylenephosphonic acid, ethylenediamine-N,N,N',N'-tetramethylenephosphonic acid, transcyclohexanediamine-tetraacetic acid, 1,2-diaminopropane-tetraacetic acid, hydroxyethyliminodiacetic acid, glycol ether diamine-tetraacetic acid, ethylenediamine-orthohydroxyphenylacetic acid-1,2,4-tricarboxylic acid, 1-hydroxy-ethylidene-1,1-diphosphonic acid, and N,N'-bis(2-hydroxybenzyl)-ethylenediamine-N,N'-diacetic acid. If desired, two or more such chelating agents may be added to the color developer in combination. The chelating agent is added to the color developer in an amount sufficient to sequester the metal ions in the color developer. Typically, the amount is approximately from 0.1 g/liter to 10 g/liter.

The color developer may optionally contain a development accelerator. However, it is preferred that the color developer for use in the present invention does not contain a substantial amount of benzyl alcohol from the viewpoints of prevention of environmental pollution, ease of preparation of the developer and prevention of color stains in the processed photographic material. The expression "does not contain a substantial amount of benzyl alcohol" means that the content of benzyl alcohol, if any, in the color developer is 2 ml or less per liter of developer. Most preferably, the color developer contains no benzyl alcohol.

Examples of other development accelerators which can be added to the color developer for use in the present invention include thioether compounds described in JP-B-37-16088, JP-B-37-5987, JP-B-38-7826, JP-B-44-12380, JP-B-45-9019, and U.S. Pat. 3,818,247; p-phenylenediamine compounds described in JP-A-52-49829 and JP-A-50-15554; quaternary ammonium salts described in JP-A-50-137726, JP-B-44-30074, and JP-A-56-156826 and JP-A-52-43429; amine compounds described in U.S. Pat. Nos. 2,494,903, 3,128,182, 4,230,796, 3,253,919, JP-B-41-11431, and U.S. Pat. Nos. 2,482,546, 2,596,926 and 3,582,346; polyalkylene oxides described in JP-B-37-16088, JP-B-42-25201, U.S. Pat. No. 3,128,183, JP-B-41-11431, JP-B-42-23883, and U.S. Pat. No. 3,532,501; as well as 1-phenyl-3-pyrazolidones and imidazoles. These may be added to the color developer, if desired.

The color developer for use in the present invention may further contain, if desired, an antifoggant. For example, alkali metal halides such as sodium chloride, potassium bromide or potassium iodide can be added to the color developer, as can organic antifoggants. Examples of usable organic antifoggants include nitrogen-containing heterocyclic compounds such as benzotriazole, 6-nitrobenzimidazole, 5-nitroisoindazole, 5-methylbenzotriazole, 5-nitrobenzotriazole, 5-chlorobenzotriazole, 2-thiazolyl-benzimidazole, 2-thiazolylmethylbenzimidazole, indazole, hydroxyazaindolidine, and adenine.

The color developer for use in the present invention may contain a fluorescent brightening agent. Preferred fluorescent brightening agents for use in the color developer are 4,4'-diamino-2.2'-disulfostilbene compounds. The amount of the brightening agent added to the color developer may be from 0 to 5 g/liter, preferably from 0.1 to 4 g/liter.

Additionally, the color developer may further contain various surfactants such as alkylsulfonic acids, arylsulfonic acids, aliphatic carboxylic acids and aromatic carboxylic acids.

The processing temperature for the color developer may be 20° C. to 50° C., preferably 30° C. to 45° C. The processing time in the developer may be from 20 seconds to 5 minutes, preferably from 30 seconds to 3 minutes and 20 seconds, and more preferably from one minute to 2 minutes and 30 seconds.

If desired, the color development bath may be composed of two or more tanks, where a replenisher for the color developer is supplied to the first color development tank or to the last color development tank to shorten the development time or to reduce the amount of the replenisher.

The processing method of the present invention can be applied to color reversal processing. The black-and-white developer which is used in this case is a so-called first black-and-white developer as generally used for reversal processing of conventional color photographic material. Accordingly, the developer may contain various additives which are well known and are added to conventional black-and-white developers to be used for development of conventional monochromatic silver halide photographic materials.

Examples of typical additives include a developing agent such as 1-phenyl-3-pyrazolidone, Metol or hydroquinone; a preservative such as sulfites; an alkali accelerator such as sodium hydroxide, sodium carbonate or potassium carbonate; an inorganic or organic inhibitor such as potassium bromide, 2-methylbenzimidazole or methylbenzothiazole; a hard water softener such as polyphosphates; and a development inhibitor such as a small amount of iodides or mercapto compounds.

When the photographic material of the present invention is processed with the above-mentioned developer using an automatic developing machine, it is desirable that the area of the surface of the developer which is in contact with the air (opening area) be as small as possible. In this regard, where the value obtained by dividing the opening area ($cm^2$) by the volume ($cm^3$) of the developer being used is defined as the opening ratio, the opening ratio is preferably 0.01 or less, more preferably 0.005 or less.

Additionally, it is preferred to add water to the developer tank in an amount corresponding to the amount of developer which evaporates during processing to compensate for concentration of the developer caused by evaporation.

The method of the present invention is also effective in cases in which a used developer has been regenerated for reuse.

Regeneration of a developer refers to reactivation of a used developer so that the thus regenerated and reactivated developer may be reused. To achieve regeneration, the used developer is treated with an anion-exchange resin or subjected to electric dialysis, or a so-called regenerating agent is added to the used developer so as to reactivate it.

An anion-exchange resin is preferred as the regenerating means. Especially preferred compositions of anion-exchange resins useful for regeneration as well as preferred regenerating methods using such resins are described in *DIAION Manual (I)* (14th Ed., 1986, published by Mitsubishi Chemical Industries Ltd., Japan).

Among anion-exchange resins, those having compositions described in JP-A-2-952 (corresponding to U.S. Pat. No. 4,948,711) and JP-A-1-281152 are preferred.

In a typical regeneration process, the overflow from the used developer is regenerated and the regenerated overflow is then used as a replenisher. In such cases, the regeneration percentage (which is defined as the proportion of the overflow solution in the replenisher) is preferably 50% or more, especially preferably 70% or more.

In another typical regeneration process, the processing solution (developer) in the developer tank is continuously brought into contact with an ion-exchange resin or the like (continuous regeneration system) so as to continuously reactivate the used developer.

In accordance with the method of the present invention, the photographic material is color developed and then bleached. Bleaching as referred to herein means treatment of the color-developed photographic material with a processing solution having a bleaching ability. Processing solutions having a bleaching ability include a bleaching solution and a bleach-fixing solution.

Processing solutions containing bleaching agents and fixing agents are employed to achieve desilvering. Typical examples of the desilvering step to be effected by the use of such processing solutions are as follows:

(1) Bleaching→Fixing
(2) Bleaching→Bleach-Fixing
(3) Bleaching→Water-Rinsing→Fixing
(4) Rinsing→Bleaching→Fixing
(5) Bleaching→Bleach-Fixing→Fixing
(6) Water-Rinsing→Bleach-Fixing
(7) Bleach-Fixing
(8) Fixing→Bleach-Fixing Of the above processes, (1), (2) and (5) are especially preferred. Process (2) is illustrated, for example, in JP-A-61-75352.

Regarding the configuration of the tanks of the processing baths used in the above-mentioned processes, such as the bleaching bath and the fixing bath, one bath may be composed of one or more tanks (for example, 2 to 4 tanks). Where plural tanks are used for one processing bath, a countercurrent system is preferably employed.

The processing solution for use in the present invention having a bleaching ability contains an oxidizing agent as its essential component. Examples of suitable oxidizing agents include inorganic compounds such as red prussiate of potash, ferric chloride, bichromates, persulfates and bromates, as well as some organic compounds such as aminopoly-carboxylato/iron(III) complexes.

Aminopoly-carboxylato/iron(III) complexes are preferably used in the present invention, from the viewpoints of prevention of environmental pollution, safety in handling them and resistance to corrosion of metals therewith.

Specific examples of aminopolycarboxylato/iron(III) complexes preferred for use in bleaching in the present invention are given below. These are not limitative. The redox potential of each compound is also shown.

| Compound No. | Redox Potential (mV vs. N.H.E, pH = 6) |
|---|---|
| 1. N-(2-acetamido)iminodiacetato/Fe(III) | 180 |
| 2. Methyliminodiacetato/Fe(III) | 200 |
| 3. Iminodiacetato/Fe(III) | 210 |
| 4. 1,4-Butylenediaminetetraacetato/Fe(III) | 230 |
| 5. Diethylene Thioether Diaminetetraacetato/Fe(III) | 230 |
| 6. Glycol Ether Diaminetetraacetato/Fe(III) | 240 |
| 7. 1,3-Propylenediaminetetraacetato/Fe(III) | 250 |
| 8. Ethylenediaminetetraacetato/Fe(III) | 110 |
| 9. Diethylenetriaminepentaacetato/Fe(III) | 80 |
| 10. Trans-1,2-cyclohexanediamine tetraacetate/Fe(III) | 80 |

In carrying out the method of the present invention, an oxidizing agent having a redox potential of 150 mV or more (hereinafter referred to as a "high-potential oxidizing agent"), more preferably 180 mV or more, and most preferably 200 mV or more, is desirably used from the viewpoints of rapid processability and more efficient achievement of the effects of the present invention.

The redox potential of the oxidizing agent is measured by the method described in *Transactions of the Faraday Society*, Vol. 55 (1959), pages 1312 to 1313.

The redox potential of the oxidizing agent for use in the present invention is measured by the above-mentioned method at a pH of 6.0. The reason why the potential measured at pH 6.0 is employed to define the oxidizing agent used in the present invention is as follows: After the photographic material to be processed by the method of the invention has been color-developed and introduced into the processing solution having a bleaching ability, the pH value of the film of the photographic material is lowered. When the pH value of the film is lowered quickly, bleaching fog occurs only to a minor degree. On the other hand, if the pH value is lowered slowly or the bleaching solution has a high pH, bleaching fog occurs to a more significant degree. Therefore, the pH value of about 6.0 is the criterion of generating the bleaching fog.

Of the above-mentioned Fe(III) complex compounds, Compound No. 7, 1,3-propylenediamine-tetraacetato/-Fe(III), is especially preferred (hereinafter referred to as "1,3-PDTA.Fe(III)"). This is the same compound as 1,3-diaminopropanetetraacetato/Fe(III), as disclosed in JP-A-62-222252 and JP-A-64-24253.

Aminopolycarboxylato/iron(III) complexes are used as sodium, potassium or ammonium salts. Ammonium salts of such complexes are preferred, as they have the highest bleaching ability.

In carrying out the method of the present invention, the amount of the oxidizing agent added to the processing solution having a bleaching ability is preferably 0.17 mol or more per liter of the processing solution. It is more preferably 0.25 mol or more, especially preferably 0.30 mol or more, per liter of the processing solution, from the viewpoints of accelerating rapid processing and preventing bleaching fog and staining. However, use of a processing solution containing too high a concentration of an oxidizing agent would interfere with promotion of the bleaching reaction. Therefore, the uppermost limit of the concentration of the oxidizing agent in the processing solution is about 0.7 mol per liter of the solution.

In the present invention, the oxidizing agents can be employed singly or in mixtures of two or more different oxidizing agents.

Where a mixture of two or more different oxidizing agents is used in the processing solution, the above-mentioned concentration limitation applies to the total concentration of all the oxidizing agents in the solution.

Where the processing solution having a bleaching ability contains an aminopolycarboxylato/Fe(III) complex as an oxidizing agent, the complex may be added to the processing solution in the form of the complex itself. Alternatively, an aminopolycarboxylic acid of the complex-forming compound may be added to the processing solution along with a ferric salt (for example, ferric sulfate, ferric chloride, ferric nitrate, ammonium ferric sulfate or ferric phosphate), whereupon the intended complex is formed in situ in the processing solution.

Where the complex is formed in situ in the processing solution, the amount of the aminopolycarboxylic acid may be somewhat larger than the amount necessary to form the intended ferric complex. Preferably, the excess amount of the aminopolycarboxylic acid is generally 0.01 to 10%.

The processing solution having a bleaching ability is used at a pH of from 2 to 8. To accelerate the rapid processing of the method of the present invention, the pH of the processing solution having a bleaching ability may be from 2.5 to 4.2, preferably from 2.5 to 4.0, and especially preferably from 2.5 to 3.5. The replenisher for the processing solution having a bleaching ability preferably has a pH of about 1.0 to 4.0.

In carrying out the method of the present invention, various known acids may be added to the processing solution having a bleaching ability so that the pH of the solution falls within the above range.

As such acids, those having a pKa of from 2 to 5.5 are preferred. The pKa is the logarithmic value of the reciprocal of the acid dissociation constant, and it is measured under an ion strength of 0.1 at 25° C., which is measured by the means described in S. Yoshizawa et al., *DENKI KAGAKU I*, Kyoritsu Zensho, p. 44.

Acids having a pKa of from 2.0 to 5.5 which are used for the above purpose include inorganic acids such as phosphoric acid as well as organic acids such as acetic acid, malonic acid or citric acid. Above all, organic acids having a pKa of from 2.0 to 5.5 are more preferably used, in order to attain the above-mentioned improvement. Among organic acids, those having carboxyl group(s) are especially preferred.

Organic acids having a pKa of from 2.0 to 5.5, which are preferably used in the present invention, may be either monobasic acids or polybasic acids. Polybasic acids may be in the form of their metal salts (for example, sodium or potassium salt) or ammonium salts, provided that the salts have a pKa within the above-defined range of from 2.0 to 5.5. Two or more organic acids having a pKa of from 2.0 to 5.5 may be used in combination. The acids do not include aminopolycarboxylic acids and Fe complex salts thereof.

Preferred examples of organic acids having a pKa of from 2.0 to 5.5, which are used in the present invention, include aliphatic monobasic acids such as formic acid, acetic acid, monochloroacetic acid, monobromoacetic acid, glycolic acid, propionic acid, monochloropropionic acid, lactic acid, pyruvic acid, acrylic acid, butyric acid, isobutyric acid, pivalic acid, aminobutyric acid, valeric acid and isovaleric acid; amino acid compounds such as asparagine, alanine, arginine, ethionine, glycine, glutamine, cysteine, serine, methionine and leucine; aromatic monobasic acids such as benzoic acid, mono-substituted benzoic acids (e.g., chloro- or hydroxy-substituted benzoic acid) and nicotinic acid; aliphatic dibasic acids such as oxalic acid, malonic acid, succinic acid, tartaric acid, malic acid, maleic acid, fumaric acid, oxaloacetic acid, glutaric acid and adipic acid; dibasic amino acids such as aspartic acid, glutamic acid, cysteine and ascorbic acid; aromatic dibasic acids such as phthalic acid and terephthalic acid; and polybasic acids such as citric acid.

Of the above-mentioned organic acids, monobasic acids having a carboxylic group are preferred. Acetic acid and glycolic acid are especially preferred.

The total amount of the acids to be used in the present invention is suitably 0.5 mol or more per liter of the processing solution having a bleaching ability. Preferably, it is from 1.2 to 2.5 mol/liter, more preferably from 1.5 to 2.0 mol/liter in view of the improvement of bleaching fog and the increase of stain at non-colored part after processing.

In adjusting the pH of the processing solution having a bleaching ability to fall within the above-defined range, alkali agents (for example, aqueous ammonia, KOH, NaOH, imidazole, monoethanolamine, diethanolamine) may be used along with the above-mentioned acids. Above all, use of aqueous ammonia is preferred. As an alkali agent which is used as a bleaching starter in adjusting a mother solution of the processing solution having a bleaching ability or to form the replenisher thereto, imidazole, monoethanolamine or diethanolamine is preferred.

In carrying out the method of the present invention, it is preferred to add various bleaching accelerators to the processing solution having a bleaching ability or the pre-bath. Examples of usable bleaching accelerators include compounds having a mercapto group- or disulfido group described in U.S. Pat. 3,893,858, German Patent 1,290,821, British Patent 1,138,842, JP-A-53-

95630 and *Research Disclosure* No. 17129 (July, 1978); thiazolidine derivatives described in JP-A-50-140129; thiourea derivatives described in U.S. Pat. 3,706,561; iodides described in JP-A-58-16235; polyethylene oxides described in West German Patent 2,748,430; and polyamine compounds described in JP-B-45-8836. The mercapto compounds described in British Patent 1,138,842 and JP-A-2-190856 are especially preferred.

The processing solution having a bleaching ability to be used in carrying out the method of the present invention may contain a rehalogenating agent, for example, bromides such as potassium bromide, sodium bromide or ammonium bromide, or chlorides such as potassium chloride, sodium chloride or ammonium chloride, in addition to the oxidizing agent (bleaching agent) and the various compounds mentioned above. The amount of such a rehalogenating agent to be in the processing solution may be from 0.1 to 5 mols, preferably from 0.5 to 3 mols, per liter of the processing solution.

Additionally, the processing solution having a bleaching ability preferably contains ammonium nitrate as a metal corrosion inhibitor.

In carrying out the method of the present invention, a replenishment system in the processing solution having a bleaching ability is preferably employed. Typically, the amount of the replenisher added to the bleaching solution may be 600 ml or less, preferably from 200 to 10 ml, per $m^2$ of the photographic material being processed.

The bleaching time may be 120 seconds or less, preferably 50 seconds or less, more preferably 40 seconds or less. The present invention is especially effective in cases employing such a shortened processing time.

In carrying out the method of the present invention, it is preferred that the processing solution having a bleaching ability, which contains an aminopolycarboxylato/Fe(III) complex, be aerated so that the aminopolycarboxylato/Fe(II) complex formed during the procedure of the process is oxidized. In this case, the oxidizing agent is regenerated and the photographic properties of the processed material are maintained very stably.

In the bleaching step of the method of the present invention, a so-called evaporation compensation system is preferably used in which water is supplied to the bleaching bath in an amount corresponding to the evaporated portion of the processing solution. In particular, use of such an evaporation compensation system is desirable where a bleaching solution containing a high-potential oxidizing agent is employed.

Any suitable means may be used to replenish the water in the bleaching bath in the system. For example, the following methods may be employed:

(1) A method in which a separate monitor water tank is provided apart from the bleaching tank. In this method, the evaporated amount of water from the monitor water tank is obtained; the amount of water evaporated from the bleaching tank is calculated on the basis of the previously obtained evaporated amount of water from the monitor water tank; and water is replenished to the bleaching tank in proportion to the thus calculated evaporated amount. (Refer to JP-A-1-254959 and JP-A-1-254960.) In this method, it is preferred that replenishment of water to the bleaching tank is effected intermittently in a determined amount.

(2) A method in which the specific gravity of the bleaching solution in the bleaching tank is controlled, whereupon water of a determined amount is supplied to the tank when the specific gravity has reached at least a certain value.

(3) A method in which water is replenished to the bleaching tank when the liquid level of the bleaching solution in the tank has decreased to a determined value by evaporation.

(4) A method in which the amount of water evaporated from the bleaching tank is estimated from the processing machine and the environmental conditions and water of an amount corresponding to the estimated value is constantly replenished to the tank.

Any one or more of these methods are effected once or several times a day.

Of the above-mentioned methods (1) to 4), methods (3) and (4) are preferred as variations in the composition of the processing solution may be prevented easily by simple constitution.

In method (3), it is preferred that the liquid level be detected with a level sensor and when the liquid level has decreased to a determined value, water of an amount corresponding to the lowered level is replenished to the tank.

The photographic material which is bleached with the processing solution having a bleaching ability is then processed with a processing solution having a fixing ability. Where the bleaching is effected by the use of a bleach-fixing solution, the fixing step may be omitted.

The processing solution having a fixing ability to be used in the fixing step is a fixing solution or a bleach-fixing solution.

The processing solution having a fixing ability contains a fixing agent.

Suitable fixing agents include thiosulfates such as sodium thiosulfate, ammonium thiosulfate, sodium ammonium thiosulfate or potassium thiosulfate, as well as thiocyanates (rhodanides) such as sodium thiocyanate, ammonium thiocyanate or potassium thiocyanate, and thioureas and thioethers. Above all, ammonium thiosulfate is preferred. The amount of the fixing agent may be from 0.3 to 3 mols, preferably from 0.5 to 2 mols, per liter of the fixing solution or bleach-fixing solution.

From the viewpoint of accelerating fixation, the above-mentioned ammonium thiocyanate (ammonium rhodanide), imidazole, thiourea and thioether (e.g., 3,6-dithia-1,8-octanediol) are used in combination in the fixing or bleach-fixing solution. In particular, imidazole compounds as described in JP-A-49-40943 are preferred for this purpose. The amount of these compounds to be used in combination is generally from 0.01 to 1 mol, preferably from 0.1 to 0.5 mol, per liter of fixing or bleach-fixing solution. As the case may be, it may be from 1 to 3 mols per liter of the solution in order to greatly accelerate the fixing effect.

As the fixing agent in the fixing solution or bleach-fixing solution to be used in the present invention, a combination of a thiosulfate and a thiocyanate is preferred for the purpose of accelerating the processing rate. In the combination case, the amount of the thiosufate may be within the above-mentioned range of from 0.3 to 3 mol/liter, and that of the thiocyanate may be from 1 to 3 mol/liter, preferably from 1 to 2.5 mol/liter.

In particular, a combination of ammonium thiosulfate and ammonium thiocyanate is preferred.

The fixing solution or bleach-fixing solution for use in the present invention can contain, as a preservative, sulfites (e.g., sodium sulfite, potassium sulfite, ammonium sulfite), hydroxylamine, hydrazine, and aldehyde-bisulfite adducts (e.g., acetaldehyde-sodium bisulfite adduct, especially preferably sodium benzaldehyde-o-sulfonic acid and sodium benzaldehyde-p-carboxylic acid. Further, it may also contain various fluorescent brightening agents, defoaming agents, or surfactants, as well as organic solvents such as polyvinyl pyrrolidone or methanol. As the preservative, in particular, sulfinic acid compounds described in EP 294769 are preferred.

The bleach-fixing solution can contain the compounds which may be in the above-mentioned bleaching solution.

Silver may be recovered from the processing solution having a fixing ability used in the method of the present invention so that the used solution may be regenerated. The thus regenerated solution may be reused in the method of the invention. Effective means of recovering silver from the used solution include an electrolytic method (described in French Patent 2,299,667), a precipitation method (described in JP-A-52-73037, German Patent 2,331,220), an ion-exchange method (described in JP-A-51-17114, German Patent 2,548,237), and a metal-substitution method (British Patent 1,353,805). It is preferred that such silver recovery be effected in line during the procedure of the method, in keeping with the rapid processing of the method.

Additionally, it is also preferred to supply water in an amount corresponding to the amount evaporated from the bath during the procedure of bleach-fixing along with replenishment of the replenisher thereto, as in the above-mentioned bleaching step.

In the bleach-fixing solution for use in the present invention, the amount of the bleaching agent is from 0.01 to 0.5 mol, preferably from 0.015 to 0.3 mol, and especially preferably from 0.02 to 0.2 mol, per liter of the solution.

In carrying out the method of the present invention, the bleach-fixing solution to be used at start-up (mother solution) is prepared by dissolving the above-mentioned components in water. Alternatively, the bleaching solution and the fixing solution may be separately prepared previously and they may be blended just before the start-up of processing. The fixing solution preferably has a pH of from 5 to 9, more preferably from 7 to 8. The bleach-fixing solution preferably has a pH of from 6 to 8.5, more preferably from 6.5 to 8.0.

Where a replenishment system is employed in carrying out the fixing in the method of the present invention, the amount of the replenisher added to the fixing solution or bleach-fixing solution is preferably from 100 to 3000 ml, more preferably from 300 to 1800 ml, per $m^2$ of the photographic material being processed.

Additionally, the fixing solution or bleach-fixing solution preferably contains various aminopolycarboxylic acids and organic phosphoric acids for the purpose of stabilizing the solution. Preferred compounds for this purpose are 1-hydroxyethylidene-1,1-diphosphonic acid, ethylenediamine-N,N,N',N'-tetramethylene-phosphonic acid, nitrilotrimethylene-phosphonic acid, ethylenediaminetetraacetic acid, diethylenetriamine-pentaacetic acid, cyclohexanediamine-tetraacetic acid, and 1,2-propylenediamine-tetraacetic acid. Above all, 1-hydroxyehtylidene-1,1-diphosphonic acid and ethylenediamine-tetraacetic acid are especially preferred.

In carrying out the method of the present invention, the total processing time with the processing solution having a fixing ability is preferably from 0.5 to 2 minutes, especially preferably from 0.5 to 1 minute.

In particular, the total processing time in the desilvering step in the method of the present invention is preferably short, as in the effect of the present invention is more remarkable in this case. Especially preferably, therefore, the processing time in the desilvering step is from 45 seconds to 4 minutes, more preferably from 1 minute to 2 minutes. The processing temperature in the desilvering step is from 25° to 50° C., preferably from 35° to 45°C. Where the method of the present invention is carried out at such a preferred processing temperature, the desilvering rate is improved and generation of stains in the processed photographic material may effectively be prevented.

In the method of the present invention, the photographic material as color-developed may be processed in a stopping bath or a rinsing bath, prior to the above-mentioned desilvering step.

In the desilvering step where bleaching, bleach-fixation and fixation are used for processing the photographic material of the invention in accordance with the method of the invention, it is preferred that stirring or agitation of the processing solutions in which the photographic material is being processed (or desilvered) be reinforced as much as possible in order to more effectively display the effect of the invention.

Examples of reinforced stirring means for forcedly stirring the processing solutions during the desilvering step include a method of running a jet stream of the processing solution against the emulsion-coated surface of the material, as described in JP-A-62-183460 and JP-A-62-183461; a method of promoting the stirring effect by the use of a rotating means, as described in JP-A-62-183461; a method of moving the photographic material being processed in the processing bath while the emulsion-coated surface of the material is brought into contact with a wiper blade provided in the processing bath, whereby the processing solution which is applied to the emulsion-coated surface of the material is made turbulent and the stirring effect is promoted; and a method of increasing the total circulating amount of the processing solution. Such reinforced stirring means are effective for any of the bleaching solution, bleach-fixing solution and fixing solution. It is believed that reinforcement of stirring of the processing solutions promotes penetration of the bleaching agent and fixing agent into the emulsion layer of the photographic material being processed and, as a result, increases the desilvering rate.

The above-mentioned reinforced stirring means are more effective when a bleaching accelerator is incorporated in the processing solution. In this case, the bleaching accelerating effect may be augmented remarkably, and the fixation preventing effect of the bleaching accelerator may be avoided.

The above-mentioned reinforced stirring may also preferably be applied to the color developer, rinsing water or stabilizing solution used for processing the photographic material of the present invention.

In continuous processing the photographic material of the present invention, an automatic developing machine is preferably used. The automatic developing machine to be used for processing the photographic material of the present invention is desirably equipped with a photographic material conveying means as described in JP-A-60-191257, JP-A-60-191258, and JP-A-60-191259. As is noted from the relevant disclosure of JP-A-60-191257, the conveying means may noticeably reduce the carry-over amount from the previous bath to the subsequent bath and therefore is extremely effective for preventing deterioration of the processing solution being used. For these reasons, the conveying means is especially effective to shorten the processing time in each processing step and to reduce the amount of replenisher added to each processing bath.

The processing method of the present invention comprises the above-mentioned steps of color development, bleaching, bleach-fixing and fixing. In the method, the photographic material is generally rinsed in water or stabilized, after it has been bleach-fixed or fixed. Employment of a simple process in which the photographic material as processed with a processing solution having a fixing ability is directly stabilized substantially without being rinsed in water can be used.

When a rinsing step is employed, the rinsing water to be used in the rinsing step may contain various surfactants to prevent unevenness of the finished material caused by water drops during drying of the processed photographic material. Examples of suitable surfactants include polyethylene glycol type nonionic surfactants, polyalcohol type nonionic surfactants, alkylbenzenesulfonic acid salt type anionic surfactants, higher alcohol sulfate ester salt type anionic surfactants, alkylnaphthalenesulfonic acid salt type anionic surfactants, quaternary ammonium salt type cationic surfactants, amine salt type cationic surfactants, amine salt type ampholytic surfactants and betaine type ampholytic surfactants. Since ionic surfactants often bond with various ions which are introduced into the rinsing water during processing, to form insoluble substances, nonionic surfactants are preferably used. In particular, alkylphenolethylene oxide adducts are preferred. As alkylphenols in such adducts, octyl, nonyl, dodecyl and dinonyl phenols are preferred. The number of moles of ethylene oxide in the adducts is preferably 8 to 14. Additionally, it is also preferred to add silicone type surfactants having a high defoaming effect to the rinsing water.

The rinsing water may also contain various bactericides and fungicides to prevent generation of mineral deposit in the rinsing water being used and to prevent generation of fungi in the processed photographic material. Examples of suitable bactericides and fungicides include thiazolylbenzimidazole compounds described in JP-A-57-157244 and JP-A-58-105145; isothiazolone compounds described in JP-A-57-8542; chlorophenol compounds such as trichlorophenol; bromophenol compounds; organic tin or zinc compounds; thiocyanic acid or isothiocyanic acid compounds; acid amide compounds; diazine or triazine compounds; thiourea compounds, benzotriazole-alkylguanidine compounds; quaternary ammonium salts such as benzalconium chloride; antibiotics such as penicillin; and various conventional fungicides and bactericides as described in *Journal of Antibacterial and Antifungal Agents,* Vol. 1, No. 5, pp. 207 to 223 (1983). One or more of these bactericides and fungicides can be added to the rinsing water. Additionally, various germicides described in JP-A-48-83820 may be used for the same purpose.

It is also preferred to incorporate various chelating agents into the rinsing water. Preferred examples of chelating agents include aminopolycarboxylic acids such as ethylenediaminetetraacetic acid and diethylenetriamine-pentaacetic acid; organic phosphonic acids such as 1-hydroxyethylidene-1,1-diphosphonic acid, ethylenediamine-tetraacetic acid and diethylenetriamine-N,N,N',N'-tetramethylenephosphonic acid; as well as hydrolyzates of maleic anhydride polymers described in European Patent 345172A1.

It is preferred that the preservative which may be incorporated into the above-mentioned fixing solution or bleach-fixing solution also be incorporated into the rinsing water.

As a stabilizing solution to be used in the stabilizing step, a processing solution capable of stabilizing the dye image formed in the processed photographic material may be used. Examples of stabilizinng solutions include an organic acid-containing solution, a solution containing an agent having a buffering ability to provide a pH of from 3 to 6, and a solution containing an aldehyde (e.g., formalin, glutaraldehyde). All the compounds which may be added to the rinsing water may also be added to the stabilizing solution. Additionally, the stabilizing solution may further contain, if desired, various ammonium compounds such as ammonium chloride or ammonium sulfite; metal compounds of Bi or Al; fluorescent brightening agents; N-methylol compounds described in JP-A-2-153350, JP-A-2- 153348, and U.S. Pat. No. 4,859,574; as well as other various dye image-stabilizing agents. In using the stabilizing solution, various known stabilizing methods may be employed. In addition, various hardening agents and alkanolamines as described in U.S. Pat. No. 4,786,583 may be incorporated into the stabilizing solution.

The rinsing step and stabilizing step are preferably carried out in a multi-stage countercurrent system in which the number of the processing stages is preferably from 2 to 4. In these steps, the amount of the replenisher may be from 1 to 50 times, preferably from 2 to 30 times, and more preferably from 2 to 15 times, the carryover from the previous bath, per unit area of the photographic material being processed.

As water to be used in the rinsing step and stabilizing step, tap water may be used. More preferably, deionized water treated with an ion-exchange resin or the like to have a reduced Ca concentration of 5 mg/liter or less and a reduced Mg concentration of 5 mg/liter or less, and a sterilized water as treated with a halogen or ultraviolet sterilizing lamp, can be used.

Tap water may be used to compensate for the evaporated portions of the processing solutions. More preferably, the above-mentioned deionized water or sterilized water, which is preferably used in the rinsing step or stabilizing step, is also used for this purpose.

In carrying out the method of the present invention, it is preferred to also replenish a proper amount of water or a compensating amount of water or a processing replenisher to the processing solutions other than the above-mentioned bleaching solution, bleach-fixing solution or fixing solution, to compensate for concentration of the solutions caused by evaporation during processing.

The overflow solution from the rinsing step or stabilizing step is preferably recirculated to the previous bath of the solution having a fixing ability, whereby the amount of waste liquid to be drained from the method can be reduced.

In carrying out the method of the present invention, the total processing time after the bleaching step and before the drying step (including the bleaching time and excluding the drying time) is preferably 1 minute to 3 minutes, as the effect of the invention is displayed most efficiently under this condition. More preferably, it is from 1 minute and 20 seconds to 2 minutes.

The photographic material of the present invention is not particularly limited, provided that it has at least one blue-sensitive silver halide emulsion layer, at least one green-sensitive silver halide emulsion layer and at least one red-sensitive silver halide emulsion layer on a support. In the material, the number of the silver halide emulsion layers and light-insensitive layers as well as the order of the layers on the support is not particularly limited. One typical example is a silver halide color photographic material having plural light-sensitive layer units each composed of plural silver halide emulsion layers each having substantially the same color-sensitivity but having a different sensitivity degree. The respective light-sensitive layers are unit light-sensitive layers each having a color-sensitivity to any one of blue light, green light and red light. In such a multi-layer silver halide color photographic material, in general, the order of the unit light-sensitive layers on the support comprises a red-sensitive layer unit, a green-sensitive layer unit and a blue-sensitive layer unit formed on the support in this order. As the case may be, however, the order may be opposite to the above-mentioned one, in accordance with the object of the photographic material. As still another embodiment, a different color-sensitive layer may be sandwiched between the same color-sensitive layers.

Various light-insensitive layers such as an interlayer may be provided between the above-mentioned silver halide light-sensitive layers, or on or below the uppermost layer or lowermost layers.

Such an interlayer may contain various couplers described in JP-A-61-43748, JP-A-59-113438, JP-A-59-113440, JP-A-61-20037 and JP-A-61-20038, and it may also contain conventional color mixing preventing agents, ultraviolet absorbents and stain inhibitors.

As the constitution of the plural silver halide emulsions which constitute the respective light-sensitive layer units, a two-layered constitution composed of a high-sensitivity emulsion layer and a low-sensitivity emulsion layer is preferred, as described in West German Patent 1,121,470 and British Patent 923,045. In general, it is preferred that the plural light-sensitive layers be arranged on the support in such a way that the sensitivity degree of the layer gradually decreases in the direction of the support. In one embodiment, a light-insensitive layer may be provided between the plural silver halide emulsion layers. In another embodiment, a low-sensitivity emulsion layer is formed for from the support and a high-sensitivity emulsion layer is formed close to the support, as described in JP-A-57-112751, JP-A-62-200350, JP-A-62-206541, and JP-A-62-206543.

Specific examples of the layer constitution on the support include an order of low-sensitivity blue-sensitive layer (BL)/high-sensitivity blue-sensitive layer (BH)/high-sensitivity green-sensitive layer (GH)/low-sensitivity green-sensitive layer (GL)/high-sensitivity red-sensitive layer (RH)/low-sensitivity red-sensitive layer (RL), from the farthest side from the support; and an order of BH/BL/GL/GH/RH/RL; and an order of BH/BL/GH/GL/RL/RH.

Other examples include an order of blue-sensitive layer/GH/RH/GL/RL from the farthest side from the support, as described in JP-B-55-34932; and an order of blue-sensitive layer/GL/RL/GH/RH from the farthest side from the support, as described in JP-A-56-25738 and JP-A-62-63936.

Further example is a three-layer unit constitution as described in JP-B-49-15495, where the uppermost layer is a highest-sensitivity silver halide emulsion layer, the intermediate layer is a silver halide emulsion layer having a lower sensitivity than the uppermost layer, and the lowermost layer is a silver halide emulsion layer having a sensitivity lower than that of the intermediate layer. That is, in the layer constitution of this type, the sensitivity degree of each emulsion layer gradually decreases in the direction of the support. Even in the three-layer constitution of this type, each of the same color-sensitivity layers may be composed of three layers of middle-sensitivity emulsion layer/high-sensitivity emulsion layer/low-sensitivity emulsion layer as formed in this order from the farthest side from the support, as described in JP-A-59-202464.

As mentioned above, various layer constitutions and arrangements may be selected in preparing the photographic materials to be processed by the method of the present invention in accordance with the objects thereof.

The processing method of the present invention may apply to any and every layer constitution and arrangement mentioned above. Preferably, the color photographic material to be processed by the method of the present invention has a dry thickness of all the constituent layers, except the support and the subbing layer and backing layer to the support, of 20.0 microns or less, in order to effectively attain the objects of the present invention. Especially preferably, this dry thickness is 18.0 microns or less.

The preferred dry thickness of the constituent layers depends upon the color developing agent taken up into the layers of the processed color photographic material. Specifically, the color developing agent remaining in the processed color photographic material has a great influence on the bleaching fog and the generation of color stains in the processed material during storage thereof.

The lower limit of the dry thickness of the constituent layers is desirably reduced to the point or within the range where the properties of the photographic material become extremely bad with respect to the above-mentioned bleaching fog and generation of color stains. For example, the lowermost value of the dry thickness of the constituent layers, except the support and the subbing layer and backing layer to the support, may be 12.0 microns; and the lowermost value of the dry thickness of all the layers which are provided between the light-sensitive layer nearest to the support and the subbing layer of the support, is 1.0 micron. Reduction of the thickness of the constituent layers may be effected by reducing the thickness of the light-sensitive layers or that of the light-insensitive layers.

The film thickness of the multi-layer color photographic material of the present invention may be measured, for example, as follows: First, the fresh photographic material to be measured is stored for 7 days at 25° C. and 50% RH. Then, the total thickness of the material is measured. Next, the layers coated on the support, except the subbing layer are removed, and the thickness of the support is measured. The difference between the total thickness of the whole material and the thickness of the support is obtained, which indicates the total thickness of all the coated layers except the subbing layer to the support. The thickness may be measured, for example, by using a contact type film thickness-measuring device equipped with a piezoelectricity conversion element (Anritsu Electric Co., Ltd., K-402B Standard Model). The coated layers may be removed from the support by applying an aqueous sodium hypochlorite solution to the photographic material.

Alternatively, a scanning electromicroscope which preferably has a magnification of at least 3000 times may be used to take a picture of the cross section of the photographic material, so as to measure the total thickness of the layers coated on the support.

The photographic material to be processed by the method of the present invention preferably has a swelling degree of from 50 to 200%, and more preferably from 70 to 150%. The swelling degree is represented by the following formula:

Swelling Degree=[[(Equilibrium swollen thickness at 25° C. in $H_2O$)−(Dry thickness at 25° C. and 55% RH)]/(Dry thickness at 25° C. and 55% RH)]×100

If the material has a swelling degree outside the above-mentioned range, the amount of color developing agent remaining in the processed photographic material would be too great and the remaining color developing agent would negatively influence the photographic properties, image qualities (dependent upon desilverability) and physical properties (film thickness) of the processed material.

Additionally, the photographic material to be processed by the method of the present invention preferably has a film swelling rate (T ½) of 15 seconds or less, more preferably 9 seconds or less. The film swelling rate (T ½) is defined as follows: 90% of the maximum swollen thickness of the photographic material as processed in a color developer at 38° C. for 3 minutes and 15 seconds is defined as the saturated swollen thickness. The time necessary to attain half (½) of the saturated swollen thickness is defined as the film swelling rate (T ½).

The silver halide in the photographic emulsion layers constituting the color photographic material to be processed by the method of the present invention may be any one of silver iodobromide, silver iodochlorobromide, silver chlorobromide, silver bromide or silver chloride. Above all, silver iodobromide, silver iodochloride or silver iodochlorobromide containing silver iodide in an amount of approximately 0.1 to 30 mol % is preferred. A silver iodobromide containing silver iodide in an amount of approximately 2 to 25 mol % is especially preferred.

The silver halide grains in the photographic emulsions constituting the photographic material of the present invention may be regular crystalline grains such as cubic, octahedral or tetradecahedral grains, or irregular crystalline grains such as spherical or tabular grains, or irregular crystalline grains having a crystal defect such as a twin plane, or composite crystalline grains composed of the above-mentioned regular and irregular crystalline forms.

Regarding the grain size of the silver halide grains, the grains may be fine grains having a small grain size of about 0.2 micron or less or they may be large ones having a grain size of up to about 10 microns as the diameter of the projected area. The emulsion of the grains may be either a polydispersed emulsion or a monodispersed emulsion.

The silver halide photographic emulsions to be used in the present invention may be prepared by various methods, for example, those described in *Research Disclosure* (RD) No. 17643 (December, 1978), pages 22 to 23 (I. Emulsion Preparation and Types); RD No. 18716 (November, 1979), pages 648 P. Glafkides, *Chimie et Physique Photographique* (published by Paul Montel, 1967); G. F. Duffin, *Photographic Emulsion Chemistry* (published by Focal Press, 1966); and V. L. Zelikman et al, *Making and Coating Photographic Emulsion* (published by Focal Press, 1964).

Monodispersed emulsions as described in U.S. Pat. Nos. 3,574,628 and 3,655,394 and British Patent 1,413,748 are also preferably used in the present invention.

Additionally, tabular grains having an aspect ratio of about 5 or more may be used in the present invention. Such tabular grains may be prepared easily in accordance with various methods, for example, as described in Gutoff, *Photographic Science and Engineering,* Vol. 14, pages 248 to 257 (1970); and U.S. Pat. Nos. 4,434,226, 4,414,310, 4,430,048, and 4,439,520 and British Patent 2,112,157.

Regarding the crystal structure of the silver halide grains constituting the emulsions of the invention, the grains may have the same halogen composition throughout the whole grain, or they may have different halogen compositions between the inside part and the outside part of each grain, or they may have a layered structure. Further, the grains may have different halogen compositions as conjugated by epitaxial bond, or they may have components other than silver halides, such as silver rhodanide or lead oxide, as conjugated with the silver halide matrix.

Additionally, a mixture of various grains of different crystalline forms may be employed in the present invention.

The emulsions for use in the invention are generally physically ripened, chemically ripened and/or spectrally sensitized. Additives to be used in such a ripening or sensitizing step are described in *Research Disclosure* Nos. 17643 (December, 1978), 18716 (November, 1979) and 307105 (November 1989), and the related descriptions in these references are shown in the Table below.

Other known photographic additives which may be used in preparing the photographic materials of the present invention are also mentioned in these sources, and the related descriptions therein are cited in the Table.

| Additives | RD 17643 (Dec. 1978) | RD 18716 (Nov. 1979) | RD 307105 (Nov. 1989) |
|---|---|---|---|
| 1. Chemical Sensitizer | p. 23 | p. 648, right column | p. 866 |
| 2. Sensitivity Enhancer | | p. 648, right column | |
| 3. Spectral Sensitizer Supercolor Sensitizer | pp. 23-24 | from p. 648, right column to p. 649, right column | pp. 866-868 |
| 4. Whitening Agent | p. 24 | p. 647, right column | p. 868 |
| 5. Antifoggant Stabilizer | pp. 24-25 | p. 649, right column | pp. 868-870 |

-continued

| Additives | RD 17643 (Dec. 1978) | RD 18716 (Nov. 1979) | RD 307105 (Nov. 1989) |
|---|---|---|---|
| 6. Light Absorbent Filter Dye UV Absorbent | pp. 25-26 | from p. 649, right column to p. 650, left column | p. 873 |
| 7. Stain Inhibitor | p. 25, right column | p. 650, left to right column | p. 872 |
| 8. Dye Image Stabilizer | p. 25 | p. 650, left column | p. 872 |
| 9. Hardening Agent | p. 26 | p. 651, left column | pp. 874-875 |
| 10. Binder | p. 26 | p. 651, left column | pp. 873-874 |
| 11. Plasticizer Lubricant | p. 27 | p. 650, right column | p. 876 |
| 12. Coating Aid Surfactant | pp. 26-27 | p. 650, right column | pp. 875-876 |
| 13. Antistatic Agent | p. 27 | p. 650, right column | pp. 876-877 |
| 14. Mat Agent | | | pp. 878-879 |

Various color couplers can be used in the present invention, and examples of suitable color couplers are described in patent publications as referred to in the above-mentioned RD No. 17643, VII-C to G, and RD No. 307105, VII-C to G.

As yellow couplers, for example, those described in U.S. Pat. Nos. 3,933,501, 4,022,620, 4,326,024, 4,401,752, 4,248,961, JP-B-58-10739, British Patents 1,425,020, 1,476,760, U.S. Pat. Nos. 3,973,968, 4,314,023, 4,511,649, and European Patent 249,473A are preferred.

As magenta couplers, 5-pyrazolone compounds and pyrazoloazole compounds are preferred. For instance, those described in U.S. Pat. Nos. 4,310,619, 4,351,897, European Patent 73,636, U.S. Pat. Nos. 3,061,432, 3,725,064, RD No. 24220 (June, 1984), JP-A-60-33552, RD No. 24230 (June, 1984}, JP-A-60-43659, JP-A-61-72238, JP-A-60-35730, JP-A-55-118034, JP-A-60-185951, U.S. Pat. Nos. 4,500,630, 4,540,654, 4,556,630 , and WO(PCT)88/04795 are preferred.

As cyan couplers, phenol couplers and naphthol couplers are preferred. For instance, those described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011, 4,327,173, West German Patent (OLS) No. 3,329,729, European Patents 121,365A, 249,453A, U.S. Pat. Nos. 3,446,622, 4,333,999, 4,753,871, 4,451,559, 4,427,767, 4,690,889, 4,254,212, 4,296,199, and JP-A-61-42658 are preferred.

As colored couplers for correcting the unnecessary absorption of colored dyes, those described in RD No. 17643, VII-G, U.S. Pat. No. 4,163,670, JP-B-57-39413, U.S. Pat. Nos. 4,004,929, 4,138,258, and British Patent 1,146,368 are preferred. Additionally, couplers for correcting the unnecessary absorption of colored dyes by a phosphor dye released during coupling, as described in U.S. Pat. No. 4,774,181, as well as couplers having a dye precursor group capable of reacting with a developing agent to form dyes as split-off groups, as described in U.S. Pat. No. 4,777,120, are also preferably used.

Couplers capable of forming colored dyes having a pertinent diffusibility may also be used, and those described in U.S. Pat. No. 4,366,237, British Patent 2,125,570, European Patent 96,570, and West German Patent (OLS) No. 3,234,533 are preferred.

Polymerized dye-forming couplers may also be used, and typical examples of such couplers are described in U.S. Pat. Nos. 3,451,820, 4,080,211, 4,367,282, 4,409,320, 4,576,910, and British Patent 2,102,173.

Couplers capable of releasing a photographically useful group may also be used in the present invention. For instance, as couplers capable of imagewise releasing a nucleating agent or development accelerator during development, those described in British Patents 2,097,140 and 2,131,188, and JP-A-59-157638 and JP-A-59-170840 are preferred.

Additional examples of couplers which may be incorporated into the photographic materials of the present invention include competing couplers as described in U.S. Pat. No. 4,130,427; couplers capable of releasing a dye which recolors after being released from the coupler, as described in European Patent 173,302A; bleaching accelerator-releasing couplers as described in RD Nos. 11449 and 24241, and JP-A-61-201247; ligand-releasing couplers, as described in U.S. Pat. No. 4,553,477; leuco dye-releasing couplers, as described in JP-A-63-75747; and couplers capable of releasing a phosphor dye, as described in U.S. Pat. No. 4,774,181.

The above-mentioned couplers can be incorporated into the photographic materials of the present invention by various known dispersion methods.

For example, an oil-in-water dispersion method may be employed for this purpose. Examples of high boiling point solvents usable in this method are described in U.S. Pat. No. 2,322,027. Examples of high boiling point organic solvents having a boiling point of 175° C. or higher at normal pressure which may be used in an oil-in-water dispersion include phthalates (e.g., dibutyl phthalate, dicyclohexyl phthalate, di-2-ethylhexyl phthalate, decyl phthalate, bis(2,4-di-t-amylphenyl) phthalate, bis(2,4-di-t-amylphenyl) isophthalate, bis(1,1-diethylpropyl) phthalate, phosphates or phosphonates (e.g., triphenyl phosphate, tricresyl phosphate, 2-ethylhexyl diphenylphosphate, tricyclohexyl phosphate, tri-2-ethylhexyl phosphate, tridodecyl phosphate, tributoxyethyl phosphate, trichloropropyl phosphate, di-2-ethylhexylphenyl phosphonate), benzoates (e.g., 2-ethylhexyl benzoate, dodecyl benzoate, 2-ethylhexyl p-hydroxybenzoate), amides (e.g., N,N-diethyldodecanamide, N,N-diethyllaurylamide, N-tetradecylpyrrolidone), alcohols or phenols (e.g., isostearyl alcohol, 2,4-di-tertamylphenol), aliphatic carboxylates (e.g., bis(2-ethylhexyl) sebacate, dioctyl azelate, glycerol tributylate, isostearyl lactate, trioctyl citrate), aniline derivatives (e.g., N,N-dibutyl-2-butoxy-5-tertoctylaniline), and hydrocarbons (e.g., paraffin, dodecylbenzene, diisopropylnaphthalene). As an auxiliary solvent, organic solvents having a boiling point of approximately from 30° to 160° C., preferably from 50° to 160° C., can be used. Examples of such auxiliary organic solvents include ethyl acetate, butyl acetate, ethyl propionate, methyl ethyl ketone, cyclohexanone, 2-ethoxyethyl acetate and dimethylformamide.

A latex dispersion method may also be employed to incorporate couplers into the photographic material of the present invention. The steps of carrying out the dispersion method, the effect of the method and examples of latexes usable in the method for impregnation are described in U.S. Pat. No. 4,199,363, and West German Patent (OLS) Nos. 2,541,274 and 2,541,230.

As still another method, the above-mentioned couplers may be applied to a loadable latex polymer (for example, as described in U.S. Pat. No. 4,203,716) in the presence or absence of the above-mentioned high boiling point organic solvent and the resulting polymer may be emulsified and dispersed in an aqueous hydrophilic colloid solution; or they may be dissolved in a water-insoluble but organic solvent-soluble polymer, and the resulting solution may be emulsified and dispersed in the solution.

Preferably, homopolymers or copolymers as described in International Patent Laid-Open No. W088/00723 (pages 12 to 30) are employed in this method. In particular, acrylamide polymers are recommended as being effective to stabilize the color images formed in the photographic material.

The present invention may apply to various color photographic materials. Specific examples include general or movie color negative films, and slide or television color reversal films.

Supports suitable for use in preparing the photographic materials of the present invention are described, for example, in the above-mentioned RD No. 17643, page 28, and RD No. 18716, from page 647, right column to page 648, left column.

The present invention is explained in more detail by way of the following examples, which, however, are not intended to restrict the scope of the invention.

EXAMPLE 1

The layers described below were formed on a cellulose triacetate film support having a subbing layer to form a multi-layer color photographic material sample which is designated as Sample No. 101.

Compositions of Light-Sensitive Layers

The numbers corresponding to the respective components described below indicate the amounts coated in g/m$^2$. For silver halides and colloidal silvers, the number indicates the amount of silver therein. For couplers, additives and gelatin, the number indicates the amount as coated. For sensitizing dyes, the amount coated is given in mols per mol of silver halide in the same layer. Meanings of the symbols identifying the respective additives are explained below. Where one additive substance has plural functions or actions, the most common one is given.

| | |
|---|---|
| UV: | Ultraviolet Absorbent |
| Solv: | High Boiling Point Organic Solvent |
| ExF: | Dye |
| ExS: | Sensitizing Dye |
| ExC: | Cyan Coupler |
| ExM: | Magenta Coupler |
| ExY: | Yellow Coupler |
| Cpd: | Additive |

Further, the term "sphere-corresponding diameter" as used hereinafter means a diameter of a sphere having the volume equivalent to that of emulsion grain, and the term "variation coefficient" is represented by $S/\gamma$ wherein S is a standard deviation with respect to diameter and $\gamma$ represents a mean diameter.

| | |
|---|---|
| First Layer (Anti-Halation Layer): | |
| Black Colloidal Silver | 0.15 |
| Gelatin | 2.33 |
| ExM-6 | 0.11 |
| UV-1 | $3.0 \times 10^{-2}$ |
| UV-2 | $6.0 \times 10^{-2}$ |
| UV-3 | $7.0 \times 10^{-2}$ |
| Solv-1 | 0.16 |
| Solv-2 | 0.10 |
| ExF-1 | $1.0 \times 10^{-2}$ |
| ExF-2 | $4.0 \times 10^{-2}$ |
| ExF-3 | $5.0 \times 10^{-3}$ |
| Cpd-6 | $1.0 \times 10^{-3}$ |
| Second Layer (Low-Sensitivity Red-Sensitive Emulsion Layer): | |
| Silver Iodobromide Emulsion (AgI 4.0 mol %; uniform AgI type grains; sphere-corresponding diameter 0.4 μm; variation coefficient of sphere-corresponding diameter 30%; tabular grains having an aspect ratio of diameter/thickness of 3.0) | 0.35 as Ag |
| Silver Iodobromide Emulsion (AgI 6.0 mol %; AgI-rich core-type grains with core/shell ratio of 1/2; sphere-corresponding diameter 0.45 μm; variation coefficient of sphere-corresponding diameter 23%; tabular grains having an aspect ratio of diameter/thickness of 2.0) | 0.18 as Ag |
| Gelatin | 0.77 |
| ExS-1 | $2.4 \times 10^{-4}$ |
| ExS-2 | $1.4 \times 10^{-4}$ |
| ExS-5 | $2.3 \times 10^{-4}$ |
| ExS-7 | $4.1 \times 10^{-6}$ |
| ExC-1 | 0.17 |
| ExC-2 | $4.0 \times 10^{-2}$ |
| ExC-3 | $8.0 \times 10^{-2}$ |
| Third Layer (Middle-Sensitivity Red-Sensitive Emulsion Layer): | |
| Silver Iodobromide Emulsion (AgI 6.0 mol %; AgI-rich core-type grains with core/shell ratio of 1/2; sphere-corresponding diameter 0.65 μm; variation coefficient of sphere-corresponding diameter 23%; tabular grains having an aspect ratio of diameter/thickness of 2.0) | 0.80 as Ag |
| Gelatin | 1.46 |
| ExS-1 | $2.4 \times 10^{-4}$ |
| ExS-2 | $1.4 \times 10^{-4}$ |
| ExS-5 | $2.4 \times 10^{-4}$ |
| ExS-7 | $4.3 \times 10^{-6}$ |
| ExC-1 | 0.38 |
| ExC-2 | $2.0 \times 10^{-2}$ |
| ExC-3 | 0.12 |
| ExM-7 | $3.0 \times 10^{-2}$ |
| UV-2 | $5.7 \times 10^{-2}$ |
| UV-3 | $5.7 \times 10^{-2}$ |
| Fourth Layer (High-Sensitivity Red-Sensitive Emulsion Layer): | |
| Silver Iodobromide Emulsion (AgI 9.3 mol %; multi-layer structure grains with core/shell ratio of 3/4/2, having proportion of AgI content of 24/0/6 (innermost core/middle layer/outermost shell) by mol %; sphere-corresponding diameter 0.75 μm; variation coefficient of sphere-corresponding diameter 23%; tabular grains having an aspect ratio of diameter/thickness of 2.5) | 1.49 as Ag |
| Gelatin | 1.38 |
| ExS-1 | $2.0 \times 10^{-4}$ |
| ExS-2 | $1.1 \times 10^{-4}$ |
| ExS-5 | $1.9 \times 10^{-5}$ |
| ExS-7 | $1.4 \times 10^{-5}$ |
| ExC-1 | $8.0 \times 10^{-2}$ |
| ExC-4 | $9.0 \times 10^{-2}$ |
| ExC-13 | $3.0 \times 10^{-2}$ |
| Solv-1 | 0.20 |
| Solv-2 | 0.53 |
| Fifth Layer (Interlayer): | |
| Gelatin | 0.62 |
| Cpd-1 | 0.13 |

-continued

| | |
|---|---|
| Polyethyl Acrylate Latex | $8.0 \times 10^{-2}$ |
| Solv-1 | $8.0 \times 10^{-2}$ |
| Sixth Layer (Low-Sensitivity Green-Sensitive Emulsion Layer): | |
| Silver Iodobromide Emulsion (AgI 4.0 mol %; uniform AgI type grains; sphere-corresponding diameter 0.33 μm; variation coefficient of sphere-corresponding diameter 37%; tabular grains having an aspect ratio of diameter/thickness of 2.0) | 0.19 as Ag |
| Gelatin | 0.44 |
| ExS-3 | $1.5 \times 10^{-4}$ |
| ExS-4 | $4.4 \times 10^{-4}$ |
| ExS-5 | $9.2 \times 10^{-5}$ |
| ExM-5 | 0.17 |
| ExM-7 | $3.0 \times 10^{-2}$ |
| Solv-1 | 0.13 |
| Solv-4 | $1.0 \times 10^{-2}$ |
| Seventh Layer (Middle-Sensitivity Green-Sensitive Emulsion Layer): | |
| Silver Iodobromide Emulsion (AgI 4.0 mol %; uniform AgI type grains; sphere-corresponding diameter 0.55 μm; variation coefficient of sphere-corresponding diameter 15%; tabular grains having an aspect ratio of diameter/thickness of 4.0) | 0.24 as Ag |
| Gelatin | 0.54 |
| ExS-3 | $2.1 \times 10^{-4}$ |
| ExS-4 | $6.3 \times 10^{-4}$ |
| ExS-5 | $1.3 \times 10^{-4}$ |
| ExM-5 | 0.15 |
| ExM-7 | $4.0 \times 10^{-2}$ |
| ExY-8 | $3.0 \times 10^{-2}$ |
| Solv-1 | 0.13 |
| Solv-4 | $1.0 \times 10^{-2}$ |
| Eighth Layer (High-Sensitivity Green-Sensitive Emulsion Layer): | |
| Silver Iodobromide Emulsion (AgI 8.8 mol %; multi-layer structure grains with core/shell ratio of 3/4/2, having proportion of AgI content of 24/0/3 (innermost core/middle layer/outermost shell) by mol %; sphere-corresponding diameter 0.75 μm; variation coefficient of sphere-corresponding diameter 23%; tabular grains having an aspect ratio of diameter/thickness of 1.6) | 0.49 as Ag |
| Gelatin | 0.61 |
| ExS-4 | $4.3 \times 10^{-4}$ |
| ExS-5 | $8.6 \times 10^{-5}$ |
| ExS-8 | $2.8 \times 10^{-5}$ |
| ExM-5 | $8.0 \times 10^{-2}$ |
| ExM-6 | $3.0 \times 10^{-2}$ |
| ExY-8 | $3.0 \times 10^{-2}$ |
| ExC-1 | $1.0 \times 10^{-2}$ |
| ExC-4 | $1.0 \times 10^{-2}$ |
| Solv-1 | 0.23 |
| Solv-2 | $5.0 \times 10^{-2}$ |
| Solv-4 | $1.0 \times 10^{-2}$ |
| Cpd-8 | $1.0 \times 10^{-2}$ |
| Ninth Layer (Interlayer): | |
| Gelatin | 0.56 |
| Cpd-1 | $4.0 \times 10^{-2}$ |
| Polyethyl Acrylate Latex | $5.0 \times 10^{-2}$ |
| Solv-1 | $3.0 \times 10^{-2}$ |
| UV-4 | $3.0 \times 10^{-2}$ |
| UV-5 | $4.0 \times 10^{-2}$ |
| Tenth Layer (Interlayer Effect-Donating Layer to Red-Sensitive Layer): | |
| Silver Iodobromide Emulsion (AgI 8.0 mol %; AgI-rich core-type grains; with core/shell ratio of ½; sphere-corresponding diameter 0.65 μm; variation coefficient of sphere-corresponding diameter 25%; tabular grains having an aspect ratio of diameter/thickness of 2.0) | 0.67 as Ag |
| Silver Iodobromide Emulsion (AgI 4.0 mol %; uniform AgI-type grains; sphere-corresponding diameter 0.4 μm; variation coefficient of sphere-corresponding diameter 30%; tabular grains having an aspect ratio of diameter/thickness of 3.0) | 0.20 as Ag |
| Gelatin | 0.87 |

-continued

| | |
|---|---|
| ExS-3 | $6.7 \times 10^{-4}$ |
| ExM-10 | 0.16 |
| Solv-1 | 0.30 |
| Solv-6 | $3.0 \times 10^{-2}$ |
| Eleventh Layer (Yellow Filter Layer): | |
| Yellow Colloidal Silver | $9.0 \times 10^{-2}$ |
| Gelatin | 0.84 |
| Cpd-2 | 0.13 |
| Solv-1 | 0.13 |
| Cpd-1 | $8.0 \times 10^{-2}$ |
| Cpd-6 | $2.0 \times 10^{-3}$ |
| H-1 | 0.25 |
| Twelfth Layer (Low-Sensitivity Blue-Sensitive Emulsion Layer ): | |
| Silver Iodobromide Emulsion (AgI 4.5 mol %; uniform AgI-type grains; sphere-corresponding diameter 0.7 μm; variation coefficient of sphere-corresponding diameter 15%; tabular grains having an aspect ratio of diameter/thickness of 7.0) | 0.50 as Ag |
| Silver Iodobromide Emulsion (AgI 3.0 mol %; uniform AgI-type grains; sphere-corresponding diameter 0.3 μm; variation coefficient of sphere-corresponding diameter 30%; tabular grains having an aspect ratio of diameter/thickness of 7.0) | 0.30 as Ag |
| Gelatin | 2.18 |
| ExS-6 | $9.0 \times 10^{-4}$ |
| ExC-1 | 0.14 |
| ExY-9 | 0.17 |
| ExY-11 | 1.09 |
| Solv-1 | 0.54 |
| Thirteenth Layer (Interlayer): | |
| Gelatin | 0.40 |
| ExY-12 | 0.19 |
| Solv-1 | 0.19 |
| Fourteenth Layer (High-Sensitivity Blue-Sensitive Emulsion Layer): | |
| Silver Iodobromide Emulsion (AgI 10.0 mol %; AgI-rich core-type grains; sphere-corresponding diameter 1.0 μm; variation coefficient of sphere-corresponding diameter 25%; multi-layer twin tabular grains having an aspect ratio of diameter/thickness of 2.0) | 0.40 as Ag |
| Gelatin | 0.49 |
| ExS-6 | $2.6 \times 10^{-4}$ |
| ExY-9 | $1.0 \times 10^{-2}$ |
| ExY-11 | 0.20 |
| ExC-1 | $1.0 \times 10^{-2}$ |
| Solv-1 | $9.0 \times 10^{-2}$ |
| Fifteenth Layer (First Protective Layer): | |
| Fine Grain Silver Iodobromide Emulsion (AgI 2.0 mol %; uniform AgI-type grains; sphere-corresponding diameter 0.07 μm) | 0.12 as Ag |
| Gelatin | 0.63 |
| UV-4 | 0.11 |
| UV-5 | 0.18 |
| Solv-5 | $2.0 \times 10^{-2}$ |
| Cpd-5 | 0.10 |
| Polyethyl Acrylate Latex | $9.0 \times 10^{-2}$ |
| Sixteenth Layer (Second Protective Layer): | |
| Fine Grain Silver Iodobromide Emulsion (AgI 2.0 mol %; uniform AgI-type grains; sphere-corresponding diameter 0.07 μm) | 0.36 as Ag |
| Gelatin | 0.85 |
| B-1 (diameter 1.5 μm) | $8.0 \times 10^{-2}$ |
| B-2 (diameter 1.5 μm) | $2.0 \times 10^{-2}$ |
| B-3 | $2.0 \times 10^{-2}$ |
| W-4 | $2.0 \times 10^{-2}$ |
| H-1 | 0.18 |

The sample thus prepared further contained, in addition to the above-mentioned components, 2-benzisothiazolin-3-one (200 ppm on average to gelatin), n-butyl p-hydroxybenzoate (about 1,000 ppm on the same basis), and 2-phenoxyethanol (about 11,000 ppm on the same basis). Additionally, it further contained B-4, B-5, F-1, F-2, F-3, F-4, F-5, F-6, F-7, F-8, F-9, F-10, F-11, F-12, F-13, as well as iron salt, lead salt, gold salt, platinum salt, iridium salt and rhodium salt.

The respective layers contained, in addition to the above-mentioned components, surfactants (W-1), (W-2) and (W-3) as coating aids or emulsifying and dispersing aids.

The compounds used in preparing the sample are shown below.

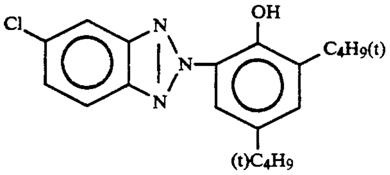
UV-1

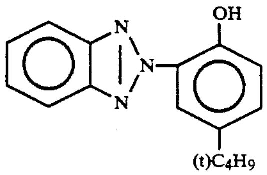
UV-2

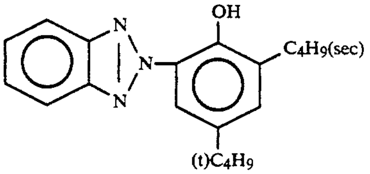
UV-3

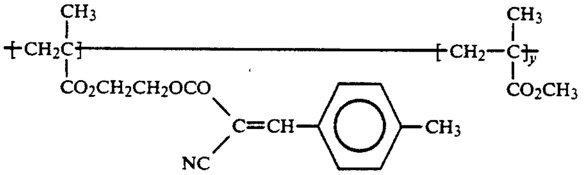
x:y = 70:30 (wt%)
UV-4

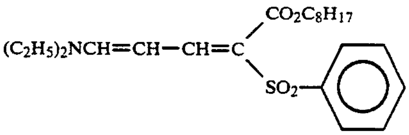
UV-5

Tricresyl Phosphate Solv-1

Dibutyl Phthalate Solv-2

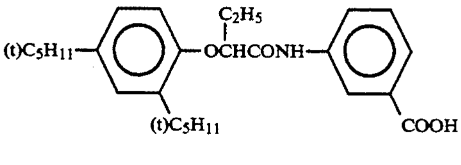
Solv-4

Trihexyl Phosphate Solv-5

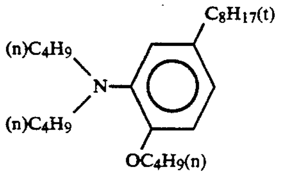
Solv-6

-continued
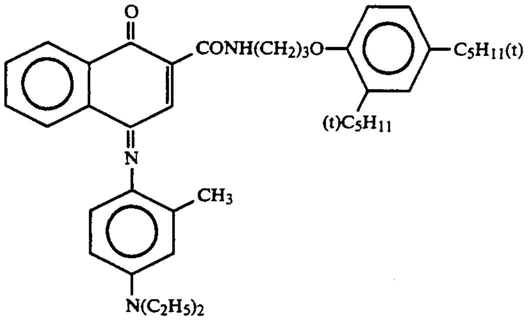
ExF-1
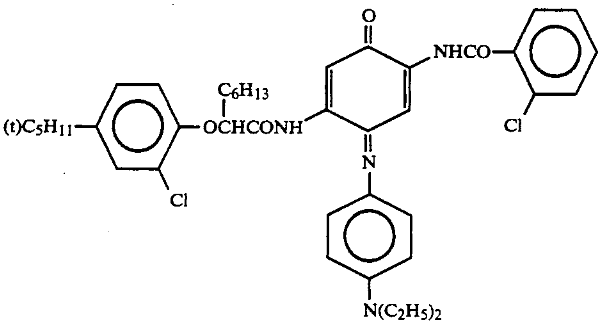
ExF-2
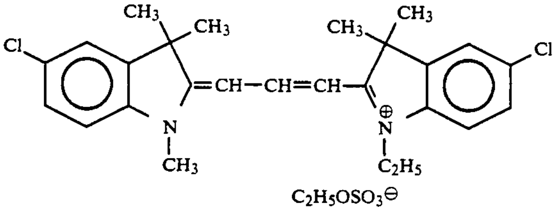
ExF-3
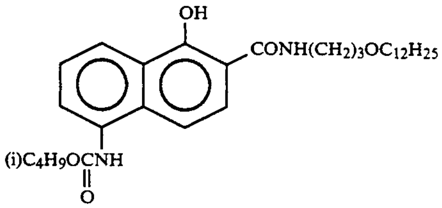
ExC-1
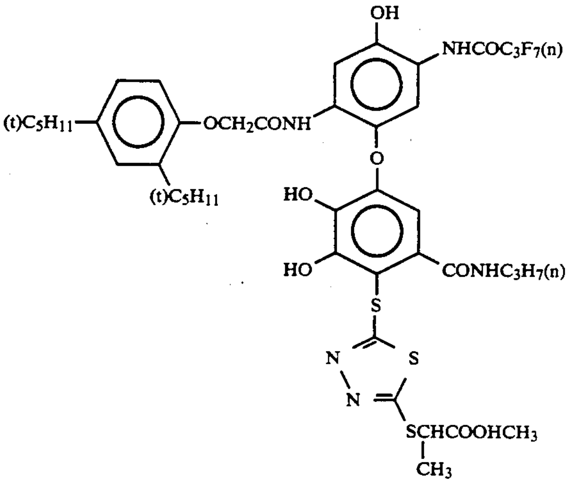
ExC-2

-continued
ExC-3
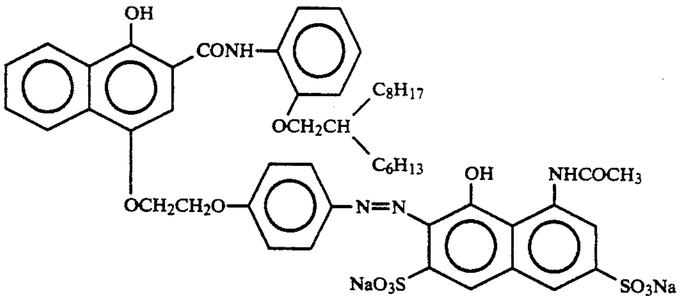
ExC-4
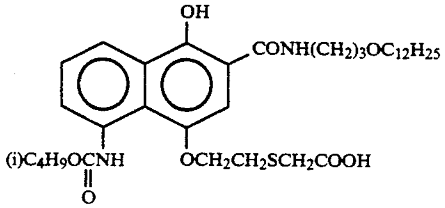
ExM-5
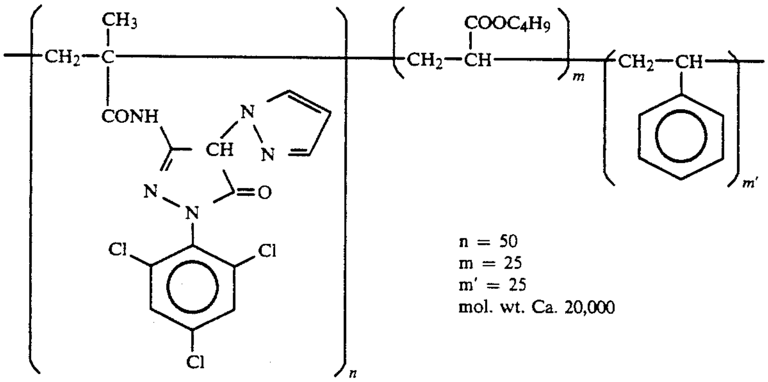
n = 50
m = 25
m' = 25
mol. wt. Ca. 20,000
ExM-6
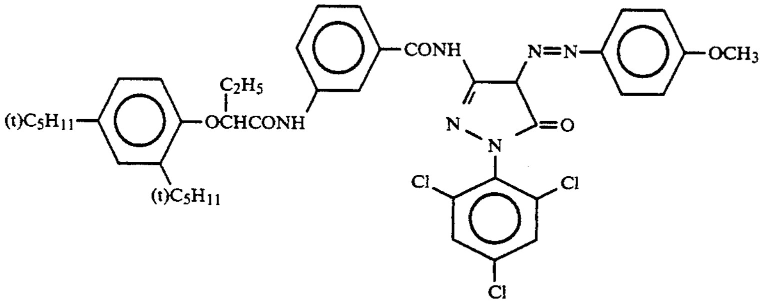
ExM-7
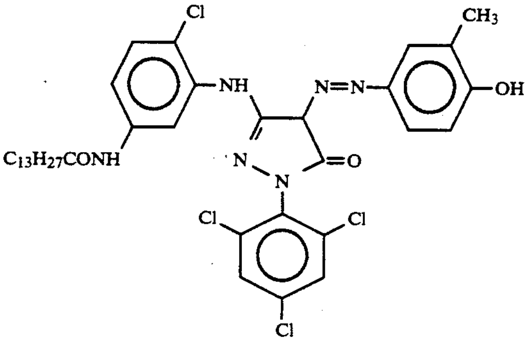

-continued
ExY-8
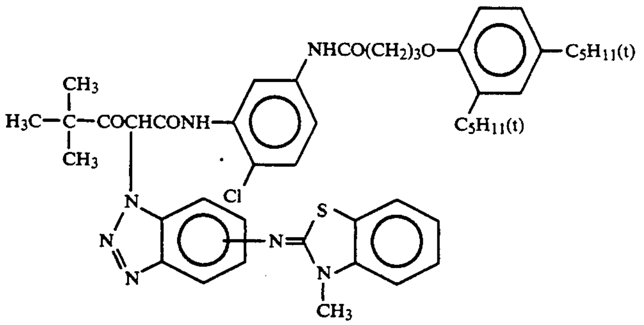
ExY-9
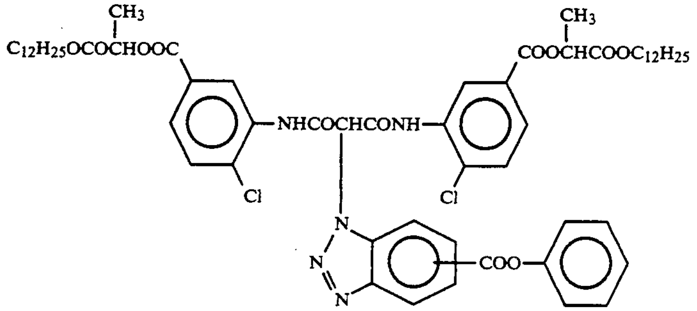
ExM-10
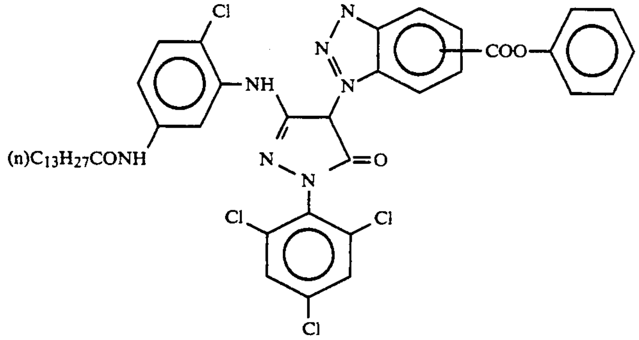
ExY-11
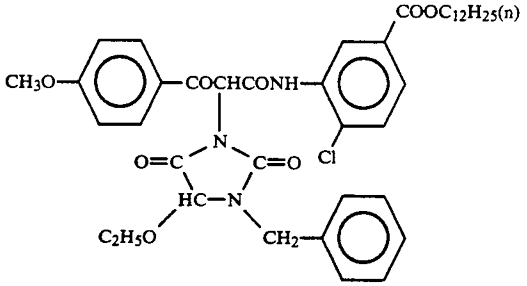
ExY-12
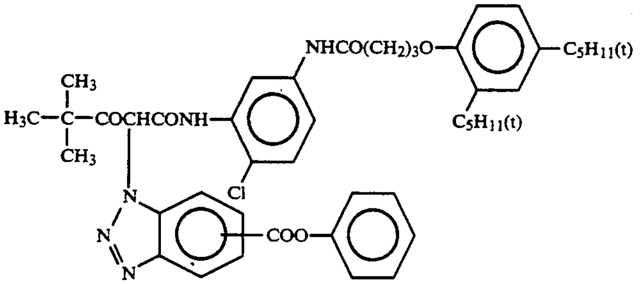

-continued
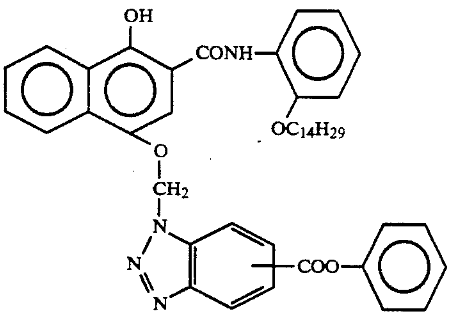
ExC-13
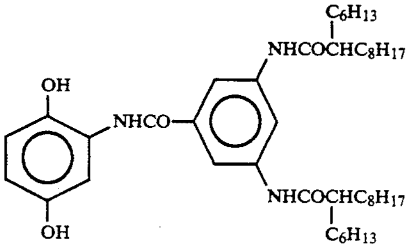
Cpd-1
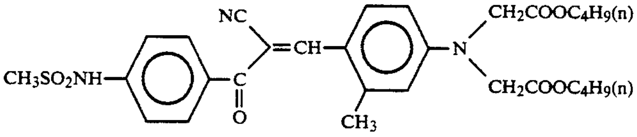
Cpd-2
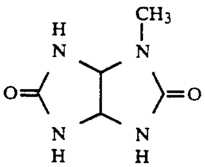
Cpd-5
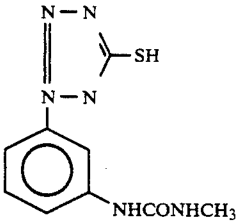
Cpd-6
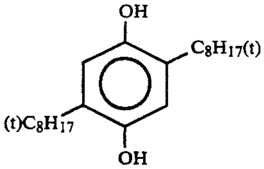
Cpd-8
$CH_2{=}CH{-}SO_2{-}CH_2{-}CONH{-}CH_2$
$CH_2{=}CH{-}SO_2{-}CH_2{-}CONH{-}CH_2$
H-1
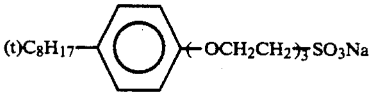
W-1
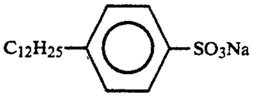
W-2

-continued
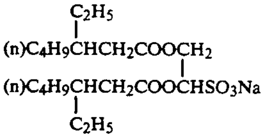
W-3
$C_8F_{17}SO_2N(C_3H_7)CH_2COOK$
W-4
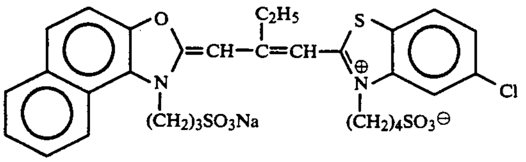
ExS-1
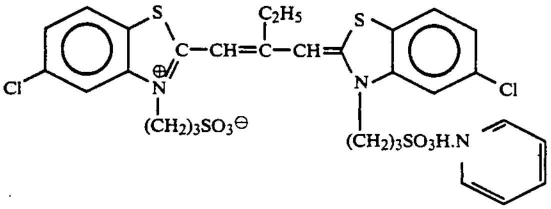
ExS-2
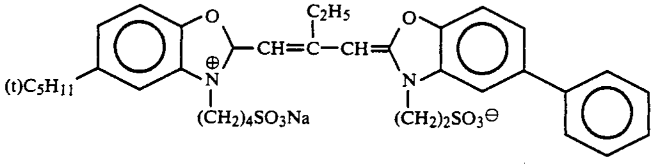
ExS-3
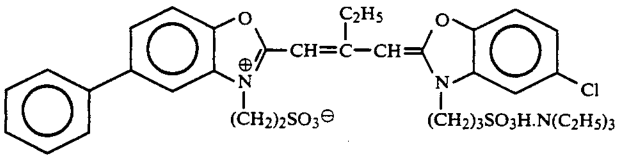
ExS-4
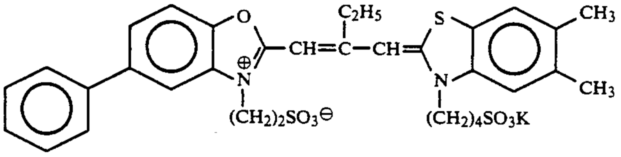
ExS-5
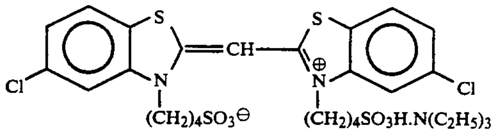
ExS-6
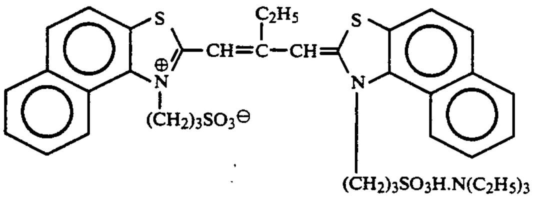
ExS-7
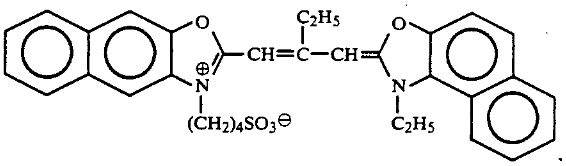
ExS-8

-continued
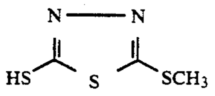
F-1
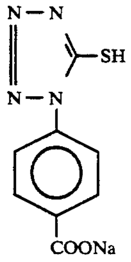
F-2
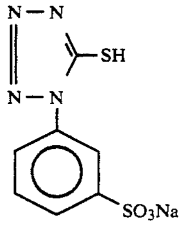
F-3
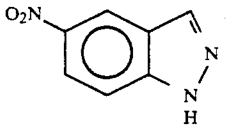
F-4
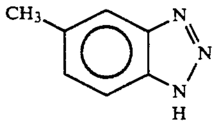
F-5
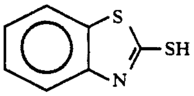
F-6
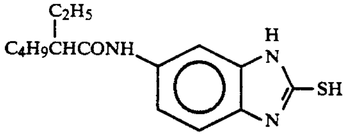
F-7
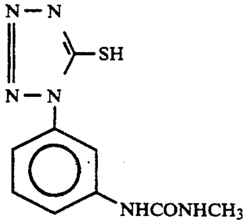
F-8
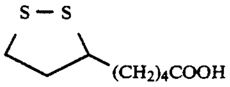
F-9

-continued

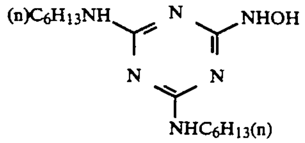

F-10

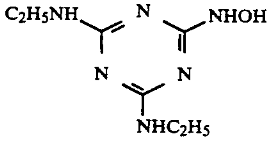

F-11

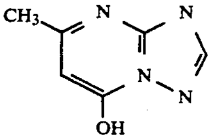

F-12

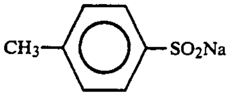

F-13

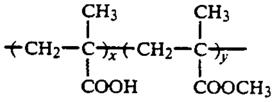

x/y = 10/90 (by mol)

B-1

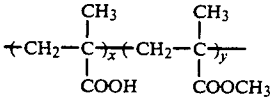

x/y = 40/60 (by mol)

B-2

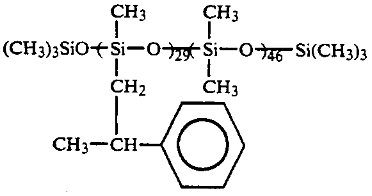

B-3

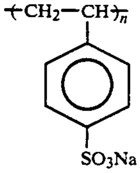

B-4

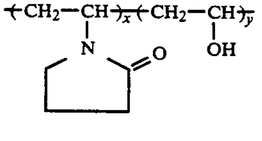

x/y = 70/30 (by mol)

B-5

Next, Sample No. 102 was prepared in the same manner as Sample No. 101, except that ExM-10 in the tenth layer was replaced by DIR coupler (D-23) of the present invention, ExY-9 in the twelfth layer by (D-5), ExY-12 in the thirteenth layer by (D-8), and ExC-13 in the fourth layer by (D-29). In each of Sample Nos. 101 and 102, the total dry thickness of all the coated layers, except the support and the subbing layer previously coated on the support, was 20.0 μm.

Each of the samples was cut into a width of 35 mm and then wedgewise exposed to a white light (having a color temperature of 4800° K. as the light source) whereupon the exposure amount to the maximum density area was 20 CMS. Each of the thus exposed samples was then processed in accordance with the process described below, where all the processing solutions were fresh ones (without any replenisher). The so processed samples were designated S1. Next, imagewise exposed samples were processed in accordance with the same process described below according to four different processing schemes which differed from each other only in the amount of replenisher added to the color developer per m2 of sample, until the amount of replenisher added to the color developer in each processing scheme became 30 liters, and thereafter other wedgewise exposed samples were processed in the same manner with the thus fatigued processing solutions. The so processed samples were designated S2. That is, the samples designated S2 were ones processed with fatigued processing solutions which were in a generally used condition.

With respect to each of the thus processed samples S1 and S2, the difference in the gradation of each of yellow, magenta and cyan colors for each layer between the two was calculated. The thus calculated value typically indicates the fluctuation, if any, of the photographic characteristics of the processed materials where the materials were processed with fresh solutions and fatigued solutions. The results obtained are shown in Table 2 below.

The gradation as referred to herein means the mean gradient value between (lowermost density+0.2) and 1.5.

The results obtained show that the continuous processing method of the present invention is superior to any other comparative processing method as the processed samples were almost free from gradation fluctuation and the method provided excellent continuous processability.

| Processing Steps: Steps | Time | Temperature | Amount of Replenisher* | Tank Capacity |
|---|---|---|---|---|
| Color Development | 3 min 15 sec | 39.0° C. | See Table 2 | 15 liters |
| Bleaching | 50 sec | 38.0° C. | 140 ml | 5 liters |
| Bleach-Fixing | 50 sec | 38.0° C. | — | 5 liters |
| Fixing | 50 sec | 38.0° C. | 420 ml | 5 liters |
| Rinsing (1) | 30 sec | 38.0° C. | — | 3 liters |
| Rinsing (2) | 20 sec | 38.0° C. | 980 ml | 3 liters |
| Stabilization | 20 sec | 38.0° C. | 560 ml | 3 liters |
| Drying | 1 min | 55° C. | | |

*Amount of replenisher is per $m^2$ of photographic material being processed.

In the process described above, rinsing was effected by a countercurrent system from rinsing tank (2) to rinsing tank (1), whereupon all the overflow from the rinsing step was introduced into the fixing bath. The top of the bleaching tank was connected to the bottom of the bleach-fixing tank via a pipe, and the top of the fixing tank was also connected to the bottom of the bleach-fixing tank via a pipe. Accordingly, all the overflows from the bleaching tank and the fixing tank caused by replenishment of replenishers thereto were introduced into the bleach-fixing bath. Replenishment to the bleach-fixing bath was effected in this way. The amount of the carryover of the developer to the next bleaching step, that of the bleaching solution to the next bleach-fixing step, that of the bleach-fixing solution to the next fixing step, and that of the fixing solution to the next rinsing step were 65 ml, 50 ml, 50 ml and 50 ml, respectively, per $m^2$ of the photographic material being processed. In the process, the crossover time was always 5 seconds, and this crossover time is included in the processing time of the previous step.

The compositions of the processing solutions used are given below.

| Color Developer: | Mother Solution (g) | Replenisher (g) |
|---|---|---|
| Diethylenetriaminepentaacetic Acid | 2.0 | 2.2 |
| 1-Hydroxyethylidene-1,1-diphosphonic Acid | 3.3 | 3.3 |
| Sodium Sulfite | 3.9 | 5.2 |

-continued

| Color Developer: | Mother Solution (g) | Replenisher (g) |
|---|---|---|
| Potassium Carbonate | 37.5 | 39.0 |
| Potassium Bromide | 1.4 | See Table 1 |
| Potassium Iodide | 1.3 mg | — |
| Hydroxylamine Sulfate | 2.4 | 3.3 |
| 2-Methyl-4-[N-ethyl-N-(β-hydroxyethyl)amino]aniline Sulfate | 4.5 | See Table 1 |
| Water to Make | 1.0 liter | 1.0 liter |
| pH | 10.05 | See Table 1 |

TABLE 1

| Amount of Replenisher added to the Color Developer (per $m^2$ of photographic material being processed) | Composition of Replenisher added to the Color Developer: Developing Agent | Potassium Bromide | pH |
|---|---|---|---|
| 1200 ml | 5.3 g/l | 0.7 g/l | 10.09 |
| 600 ml | 6.3 g/l | 0.4 g/l | 10.15 |
| 400 ml | 7.0 g/l | 0.2 g/l | 10.21 |
| 250 ml | 8.0 g/l | 0.0 g/l | 10.28 |

| | Mother Solution (g) | Replenisher (g) |
|---|---|---|
| Bleaching Solution: | | |
| Ammonium 1,3-Propylenediamine-tetraacetato/Fe(III) Monohydrate | 144.0 | 206.0 |
| Ammonium Bromide | 84.0 | 120.0 |
| Ammonium Nitrate | 17.5 | 25.0 |
| Hydroxyacetic Acid | 63.0 | 90.0 |
| Acetic Acid | 33.2 | 47.4 |
| Water to make | 1.0 liter | 1.0 liter |
| pH (adjusted with aqueous ammonia) | 3.20 | 2.80 |
| Bleach-Fixing Solution (mother solution): | | |
| The bleaching solution (mother solution) described above and the fixing solution (mother solution) described below were blended in a proportion of 15/85. | | |
| Fixing Solution: | | |
| Ammonium Sulfite | 19.0 | 57.0 |
| Ammonium Thiosulfate (aqueous solution, 700 g/liter) | 280 ml | 840 ml |
| Imidazole | 28.5 | 85.5 |
| Ethylenediaminetetraacetic Acid | 12.5 | 37.5 |
| Water to make | 1.0 liter | 1.0 liter |
| pH | 7.40 | 7.45 |
| (pH was adjusted with aqueous ammonia and acetic acid.) | | |

Rinsing Water

Mother solution and replenisher were same.

Tap water was passed through a mixed bed type column filled with an H-type strong acidic cation-exchange resin (Amberlite IR-120B, produced by Rohm & Haas Co.) and an OH-type strong basic anion-exchange resin (Amberlite IRA-400, produced by Rohm & Haas Co.) so that both the calcium ion concentration and the magnesium ion concentration in the water were reduced to 3 mg/liter, individually. Next, 20 ml/liter of sodium dichloroisocyanurate and 150 mg/liter of sodium sulfate were added to the resulting water, which had a pH of from 6.5 to 7.5. This was used as the rinsing water.

| Stabilizing Solution: Mother solution and replenisher were the same. | |
|---|---|
| Formalin (37%) | 2.0 ml |
| Polyoxyethylene-p-monononylphenyl Ether (mean polymerization degree 10) | 0.3 g |
| Disodium Ethylenediaminetetraacetate | 0.05 g |
| Water to make | 1.0 liter |
| pH | 5.0 to 8.0 |

TABLE 2

| Experiment No. | Sample No. | Amount of Replenisher added to the Color Developer (per $m^2$ of sample) | Difference in Gradation Yellow | Magenta | Cyan | |
|---|---|---|---|---|---|---|
| 1-1 | 101 | 1200 ml | 0.02 | 0.03 | 0.02 | Comparative Example |
| 1-2 | " | 600 ml | 0.04 | 0.06 | 0.00 | Comparative Example |
| 1-3 | " | 400 ml | 0.07 | 0.09 | −0.01 | Comparative Example |
| 1-4 | " | 250 ml | 0.11 | 0.14 | −0.03 | Comparative Example |
| 1-5 | 102 | 1200 ml | 0.02 | 0.02 | 0.02 | Comparative Example |
| 1-6 | " | 600 ml | 0.01 | 0.01 | 0.01 | Example of the Invention |
| 1-7 | " | 400 ml | 0.01 | 0.01 | 0.01 | Example of the Invention |
| 1-8 | " | 250 ml | 0.01 | 0.01 | 0.01 | Example of the Invention |

In Table 2 above, in the Difference in Gradation results, a positive number indicates that the contrast of the sample (S2) processed with the fatigued solutions was higher than that of the sample (S1) processed with the fresh solutions, and a negative number that the former (S2) was lower than the latter (S1).

As is clear from the results in Table 2 above, the samples processed by the method of the present invention where the particular DIR coupler of the invention was used and the amount of replenisher added to the color developer was lower than 600 ml were all better than those processed by the comparative method, in that the former were free from fluctuation in the gradation of the three colors and the color balance of the reproduced image was good. It is surprising that the fluctuation in the gradation of the three colors in the samples processed by the method of the invention was less than that of the samples processed by the comparative or conventional method using a large amount (1200 ml) of replenisher added to the color developer and further, that the color balance of the image reproduced in accordance with the processing method of the present invention was better than that produced by the conventional comparative method.

EXAMPLE 2

The same samples as those in Example 1 were processed in accordance with the processing steps described below. The results which were obtained show that only the samples processed by the method of the present invention were satisfactory, as in Example 1, in that they had excellent photographic characteristics and were almost free from fluctuation in the gradation of the reproduced colors.

| Step | Processing Method: Processing Time | Processing Temp. | Amount of Replensher* | Tank Capacity |
|---|---|---|---|---|
| Color Development | 3 min. 15 sec | 38.5° C. | See Table 1 of Example 1 | 15 liters |
| Bleaching | 1 min 00 sec | 38.0° C. | 570 ml | 5 liters |
| Bleach-Fixation | 3 min 15 sec | 38.0° C. | 850 ml | 10 liters |
| Rinsing (1) | 40 sec | 35.0° C. | — | 5 liters |
| Rinsing (2) | 1 min 00 sec | 35.0° C. | 850 ml | 5 liters |
| Stabilization | 40 sec | 38.0° C. | 570 ml | 5 liters |
| Drying | 1 min 15 sec | 55° C. | | |

*Amount of replenisher is per $m^2$ of Sample.

In the process described above, rinsing was effected by a countercurrent system from the rinsing tank (2) to the rinsing tank (1). All the overflow from the bleaching tank caused by replenishment of replenisher thereto was introduced into the bleach-fixing bath. The amount of the carryover of the developer to the next bleaching step, that of the bleaching solution to the next bleach-fixing step, and that of the bleach-fixing solution to the next rinsing step were 65 ml, 50 ml and 50 ml, respectively, per $m^2$ of photographic material being processed. In the process, the crossover time was always 10 seconds, and this crossover time is included in the processing time of the previous step.

The compositions of the processing solutions are described below.

Color Developer

Same as that used in Example 1.

| Bleaching Solution: Mother solution and replenisher were the same. | |
|---|---|
| Ammonium Ethylenediaminetetraacetato/Fe(III) Dihydrate | 120.0 g |
| Disodium Ethylenediaminetetraacetate | 10.0 g |
| Ammonium Bromide | 100.0 g |
| Ammonium Nitrate | 11.0 g |

-continued

| | |
|---|---|
| 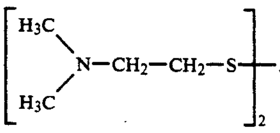 | 2.0 g |
| Aqueous Ammonia (27%) | 12.6 g |
| Water to make | 1.0 liter |
| pH | 6.30 |

| | Mother Solution (g) | Replenisher (g) |
|---|---|---|
| Bleach-Fixing Solution | | |
| Ammonium Ethylenediaminetetra-acetato/Fe(III) Dihydrate | 48.0 | — |
| Disodium Ethylenediaminetetraacetate | 4.6 | 1.0 |
| Sodium Sulfite | 12.0 | 20.0 |
| Aqueous Solution of Ammonium Thiosulfate (700 g/liter) | 240 mg | 400 ml |
| Aqueous Ammonia (27%) | 5.0 | — |
| Water to make | 1.0 liter | 1.0 liter |
| pH | 7.10 | 8.00 |

Rinsing Water

Same as that used in Example 1. Mother solution and replenisher were the same.

Stabilizing Solution

Same as that used in Example 1. Mother solution and replenisher were the same.

EXAMPLE 3

The same samples as those in Example 1 were processed in accordance with the processing steps described below. The results which were obtained show that only the samples processed by the method of the present invention were satisfactory, as in Example 1, in that they had excellent photographic characteristics and had little fluctuation in the gradation of the reproduced colors, even though they were rapidly processed at a reduced processing time and at an elevated processing temperature.

Processing Steps:

| Steps | Time | Temp. | Amount of Replenisher* | Tank Capacity |
|---|---|---|---|---|
| Color Development | 2 min 30 sec | 40.5° C. | See Table 3 | 15 liters |
| Bleaching | 46 sec | 38.0° C. | 500 ml | 5 liters |
| Bleach-Fixing | 2 min 30 sec | 38.0° C. | 1540 ml | 5 liters |
| Stabilization (1) | 31 sec | 38.0° C. | — | 3 liters |
| Stabilization (2) | 31 sec | 38.0° C. | — | 3 liters |
| Stabilization (3) | 31 sec | 38.0° C. | 1000 ml | 3 liters |
| Drying | 1 min | 55° C. | | |

*Amount of replenisher is per $m^2$ of photographic material sample being processed.

In the above-described process, stabilization was effected by a countercurrent system from the stabilization tank (3) to stabilization tank (1). All the overflow from the bleaching tank caused by replenishment of replenisher thereto was introduced into the bleach-fixing bath. The amount of the carryover of the developer to the next bleaching step, that of the bleaching solution to the next bleach-fixing step, and that of the bleach-fixing solution to the next stabilization step were 65 ml, 50 ml and 50 ml, respectively, per $m^2$ of photographic material being processed. In the process, the crossover time was always 10 seconds, and this crossover time is included in the processing time of the previous step.

The compositions of the processing solutions used are described below.

| | Mother Solution (g) | Replenisher (g) |
|---|---|---|
| Color Developer: | | |
| Diethylenetriaminepentaacetic Acid | 2.0 | 2.2 |
| 1-Hydroxyethylidene-1,1-di-phosphonic Acid | 2.0 | 2.0 |
| Sodium Sulfite | 4.5 | 4.8 |
| Potassium Carbonate | 37.0 | 39.0 |
| Potassium Bromide | 1.6 | See Table 3 |
| Potassium Iodide | 1.4 mg | — |
| Hydroxylamine Sulfate | 2.6 | 2.9 |
| 2-Methyl-4-[N-ethyl-N-(β-hydroxy-ethyl)amino]aniline Sulfate | 5.4 | See Table 3 |
| Water to Make | 1.0 liter | 1.0 liter |
| pH | 10.15 | See Table 3 |
| Bleaching Solution: | | |
| Ammonium Ethylenediaminetetra-acetato/Fe(III) Dihydrate | 175.0 | 191.0 |
| Disodium Ethylenediaminetetraacetate | 10.0 | 16.0 |
| Ammonium Bromide | 14.0 | 15.7 |
| Ammonium Nitrate | 30.0 | 30.0 |
| 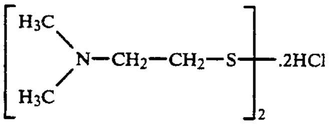 | 1.7 | 2.0 |
| Aqueous Ammonia (27%) | 3.0 | 2.0 |
| Water to make | 1.0 liter | 1.0 liter |
| pH | 5.50 | 5.20 |
| Bleach-Fixing Solution: | | |
| Ammonium Ethylenediaminetetra-acetato/Fe(III) Dihydrate | 47.7 | — |
| Disodium Ethylenediaminetetraacetate | 6.0 | 0.9 |
| Sodium Sulfite | 13.0 | 18.0 |
| Aqueous Solution of Ammonium Thiosulfate (700 g/liter) | 280 ml | 366 ml |
| Aqueous Ammonia (27%) | 5.0 | — |
| Water to make | 1.0 liter | 1.0 liter |
| pH | 6.70 | 8.00 |

Stabilizing Solution

Same as that used in Example 1.

TABLE 3

| Amount of Replenisher added to the Color Developer (per $m^2$ of photographic material being processed) | Composition of Replenisher added to the Color Developer: Developing Agent | Potassium Bromide | pH |
|---|---|---|---|
| 1200 ml | 6.3 g/l | 0.9 g/l | 10.09 |
| 600 ml | 7.3 g/l | 0.5 g/l | 10.15 |
| 400 ml | 8.1 g/l | 0.3 g/l | 10.21 |
| 200 ml | 9.5 g/l | 0.0 g/l | 10.28 |

EXAMPLE 4

The layers described below were formed on a cellulose triacetate film support having a subbing layer to form a multi-layer color photographic material sample which is designated as Sample No. 401.

Compositions of Light-Sensitive Layers

The numbers corresponding to the respective components given below indicate the amounts coated in g/$m^2$. For silver halides and colloidal silvers, the number indicates the amount of silver therein. For couplers, additives and gelatin, the number indicates the amount as coated. For sensitizing dyes, the amount coated is given in mols per mol of silver halide in the same layer.

| | |
|---|---|
| First Layer (Anti-Halation Layer): | |
| Black Colloidal Silver | 0.15 |
| Gelatin | 1.90 |
| ExM-8 | $2.0 \times 10^{-2}$ |
| Second Layer (Interlayer): | |
| Gelatin | 2.10 |
| UV-1 | $3.0 \times 10^{-2}$ |
| UV-2 | $6.0 \times 10^{-2}$ |
| UV-3 | $7.0 \times 10^{-2}$ |
| ExF-1 | $4.0 \times 10\text{-}3$ |
| Solv-2 | $7.0 \times 10^{-2}$ |

| | |
|---|---|
| Third Layer (Low-Sensitivity Red-Sensitive Emulsion Layer): | |
| Silver Iodobromide Emulsion (AgI 2.0 mol %; AgI-rich core-type grains; sphere-corresponding diameter 0.3 μm; variation coefficient of sphere-corresponding diameter 29%; mixture of normal grains and twin grains having an aspect ratio of diameter/thickness of 2.5) | 0.50 as Ag |
| Gelatin | 1.50 |
| ExS-1 | $1.0 \times 10^{-4}$ |
| ExS-2 | $3.0 \times 10^{-4}$ |
| ExS-3 | $1.0 \times 10^{-5}$ |
| ExC-3 | 0.22 |
| ExC-4 | $3.0 \times 10^{-2}$ |
| ExY-13 | $3.0 \times 10^{-2}$ |
| Solv-1 | $7.0 \times 10^{-3}$ |
| Fourth Layer (Middle-Sensitivity Red-Sensitive Emulsion Layer): | |
| Silver Iodobroide Emulsion (AgI 4.0 mol %; AgI-rich core-type grains; sphere-corresponding diameter 0.55 μm; variation coefficient of sphere-corresponding diameter 20%; mixture of normal grains and twin grains having an aspect ratio of diameter/thickness of 1.0) | 0.85 as Ag |
| Gelatin | 2.00 |
| ExS-1 | $1.0 \times 10^{-4}$ |
| ExS-2 | $3.0 \times 10^{-4}$ |
| ExS-3 | $1.0 \times 10^{-5}$ |
| ExC-2 | $8.0 \times 10^{-2}$ |
| ExC-3 | 0.33 |
| ExY-13 | $2.0 \times 10^{-2}$ |
| ExY-14 | $1.0 \times 10^{-2}$ |
| Cpd-10 | $1.0 \times 10^{-4}$ |
| Solv-1 | 0.10 |
| Fifth Layer (High-Sensitivity Red-Sensitive Emulsion Layer): | |
| Silver Iodobromide Emulsion (AgI 10.0 mol %; AgI-rich core-type grains; sphere-corresponding diameter 0.7 μm; variation coefficient of sphere-corresponding diameter 30%; mixture of normal grains and twin grains having an aspect ratio of diameter/thickness of 2.0) | 0.70 as Ag |
| Gelatin | 1.60 |
| ExS-1 | $1.0 \times 10^{-4}$ |
| ExS-2 | $3.0 \times 10^{-4}$ |
| ExS-3 | $1.0 \times 10^{-5}$ |
| ExC-5 | $7.0 \times 10^{-2}$ |
| ExC-6 | $8.0 \times 10^{-2}$ |
| Solv-1 | 0.15 |
| Solv-2 | $8.0 \times 10^{-2}$ |
| Sixth Layer (Interlayer): | |
| Gelatin | 1.10 |
| P-2 | 0.17 |

-continued

| | |
|---|---|
| Cpd-1 | 0.10 |
| Cpd-4 | 0.17 |
| Solv-1 | $5.0 \times 10^{-2}$ |
| Seventh Layer (Low-Sensitivity Green-Sensitive Emulsion Layer): | |
| Silver Iodobromide Emulsion (AgI 2.0 mol %; AgI-rich core-type grains; sphere-corresponding diameter 0.3 μm; variation coefficient of sphere-corresponding diameter 28%; mixture of normal grains and twin grains having an aspect ratio of diameter/thickness of 2.5) | 0.30 as Ag |
| Gelatin | 0.50 |
| ExS-4 | $5.0 \times 10^{-4}$ |
| ExS-5 | $2.0 \times 10^{-4}$ |
| ExS-6 | $0.3 \times 10^{-4}$ |
| ExM-8 | $3.0 \times 10^{-2}$ |
| ExM-9 | 0.20 |
| ExY-13 | $3.0 \times 10^{-2}$ |
| Cpd-11 | $7.0 \times 10^{-3}$ |
| Solv-1 | 0.20 |
| Eighth Layer (Middle-Sensitivity Green-Sensitive Emulsion Layer): | |
| Silver Iodobromide Emulsion (AgI 4.0 mol %; AgI-rich core-type grains; sphere-corresponding diameter 0.55 μm; variation coefficient of sphere-corresponding diameter 20%; mixture of normal grains and twin grains having an aspect ratio of diameter/thickness of 4.0) | 0.70 as Ag |
| Gelatin | 1.00 |
| ExS-4 | $5.0 \times 10^{-4}$ |
| ExS-5 | $2.0 \times 10^{-4}$ |
| ExS-6 | $3.0 \times 10^{-5}$ |
| ExM-8 | $3.0 \times 10^{-2}$ |
| ExM-9 | 0.25 |
| ExM-10 | $1.5 \times 10^{-2}$ |
| ExY-13 | $4.0 \times 10^{-2}$ |
| Cpd-11 | $9.0 \times 10^{-3}$ |
| Solv-1 | 0.20 |
| Ninth Layer (High-Sensitivity Green-Sensitive Emulsion Layer): | |
| Silver Iodobromide Emulsion (AgI 10.0 mol %; AgI-rich core-type grains; sphere-corresponding diameter 0.7 μm; variation coefficient of sphere-corresponding diameter 30%; mixture of normal grains and twin grains having an aspect ratio of diameter/thickness of 2.0) | 0.50 as Ag |
| Gelatin | 0.90 |
| ExS-4 | $2.0 \times 10^{-4}$ |
| ExS-5 | $2.0 \times 10^{-4}$ |
| ExS-6 | $2.0 \times 10^{-5}$ |
| ExS-7 | $3.0 \times 10^{-4}$ |
| ExM-8 | $2.0 \times 10^{-2}$ |
| ExM-11 | $6.0 \times 10^{-2}$ |
| ExM-12 | $2.0 \times 10^{-2}$ |
| ExY-13 | $1.0 \times 10^{-2}$ |
| Cpd-2 | $1.0 \times 10^{-2}$ |
| Cpd-9 | $2.0 \times 10^{-4}$ |
| Cpd-10 | $2.0 \times 10^{-4}$ |
| Solv-1 | 0.20 |
| Solv-2 | $5.0 \times 10^{-2}$ |
| Tenth Layer (Yellow Filter Layer): | |
| Gelatin | 0.90 |
| Yellow Colloidal Silver | $5.0 \times 10^{-2}$ |
| Cpd-1 | 0.20 |
| Solv-1 | 0.15 |
| Eleventh Layer (Low-Sensitivity Blue-Sensitive Emulsion Layer): | |
| Silver Iodobromide Emulsion (AgI 4.0 mol %; AgI-rich core-type grains; sphere-corresponding diameter 0.5 μm; variation coefficient of sphere-corresponding diameter 15%; octahedral grains) | 0.40 as Ag |
| Gelatin | 1.00 |
| ExS-8 | $2.0 \times 10^{-4}$ |
| ExY-13 | $9.0 \times 10^{-}$ |
| ExY-15 | 0.90 |
| Cpd-2 | $1.0 \times 10^{-2}$ |
| Solv-1 | 0.30 |
| Twelfth Layer (High-Sensitivity Blue-Sensitive Emulsion Layer): | |
| Silver Iodobromide Emulsion | 0.50 as Ag |

-continued

| | |
|---|---|
| (AgI 10.0 mol %; AgI-rich core-type grains; sphere-corresponding diameter 1.3 μm; variation coefficient of sphere-corresponding diameter 25%; mixture of normal grains and twin grains having an aspect ratio of diameter/thickness of 4.5) | |
| Gelatin | 0.60 |
| ExS-8 | $1.0 \times 10^{-4}$ |
| ExY-15 | 0.12 |
| Cpd-2 | $1.0 \times 10^{-3}$ |
| Solv-1 | $4.0 \times 10^{-2}$ |
| Thirteenth Layer (First Protective Layer): | |
| Fine Grain Silver Iodobromide Emulsion (AgI 1.0 mol %; mean grain size 0.07 μm) | 0.20 |
| Gelatin | 0.80 |
| UV-2 | 0.10 |
| UV-3 | 0.10 |
| UV-4 | 0.20 |
| Solv-3 | $4.0 \times 10^{-2}$ |
| P-2 | $9.0 \times 10^{-2}$ |
| Fourteenth Layer (Second Protective Layer): | |
| Gelatin | 0.90 |

-continued

| | |
|---|---|
| B-1 (diameter 1.5 μm) | 0.10 |
| B-2 (diameter 1.5 μm) | 0.10 |
| B-3 | $2.0 \times 10^{-2}$ |
| H-1 | 0.40 |

Further, (Cpd-3), (Cpd-5), (Cpd-6), (Cpd-7), (Cpd-8), (P-1), (W-1), (W-2) and (W-3) described below were added to the layers to improve storage stability, processability, pressure-resistance, antifungal properties, antibacterial properties, antistatic properties and coatability.

Additionally, n-butyl p-hydroxybenzoate was added to the layers. Further, the sample contained (B-4), (F-1), (F-4), (F-5), (F-6), (F-7), (F-8), (F-9), (F-10), (F-11), (F-13) and iron salt, lead salt, gold salt, platinum salt, iridium salt and rhodium salt.

The chemical names or structural formulae of the compounds are given below.

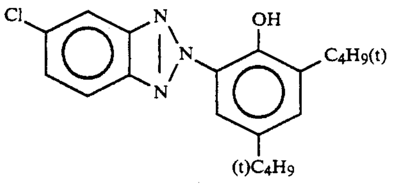

UV-1

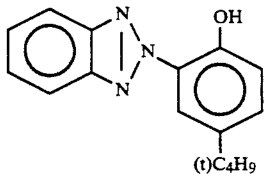

UV-2

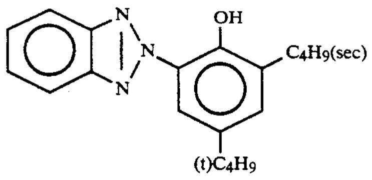

UV-3

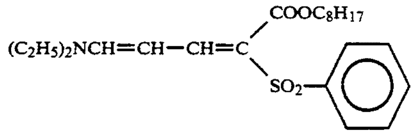

UV-4

Tricresyl Phosphate Solv-1

Dibutyl Phthalate Solv-2

Tri(2-ethylhexyl) Phosphate Solv-3

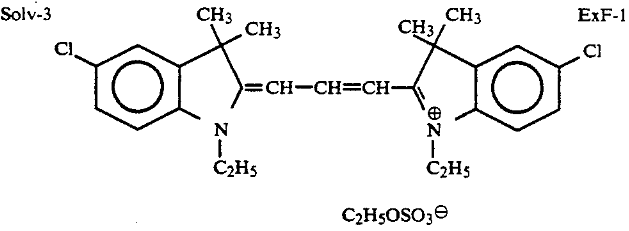

ExF-1

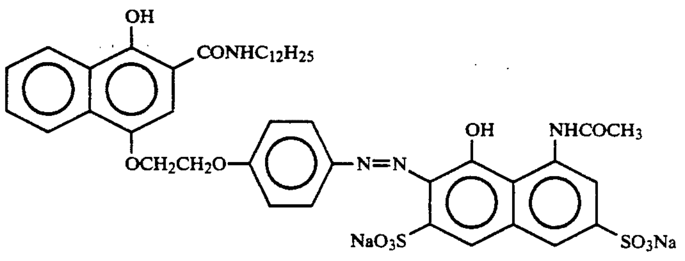

ExC-2

-continued
ExC-3
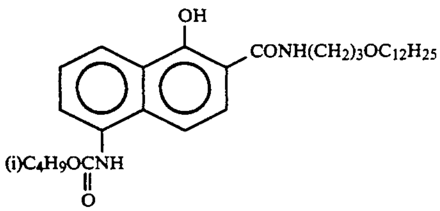
ExC-4
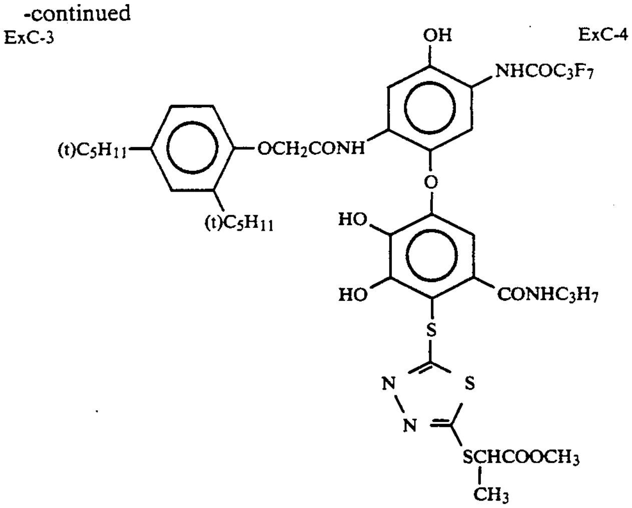
ExC-5
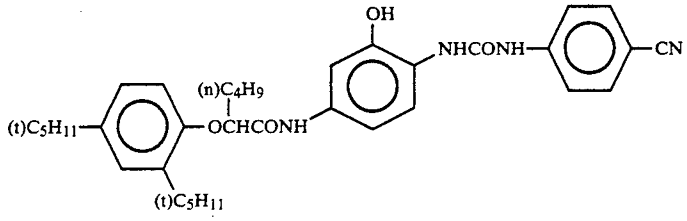
ExC-6
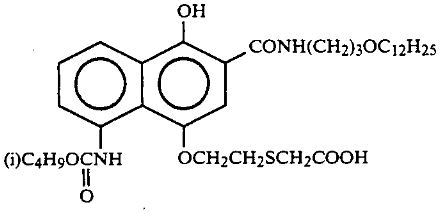
ExM-8
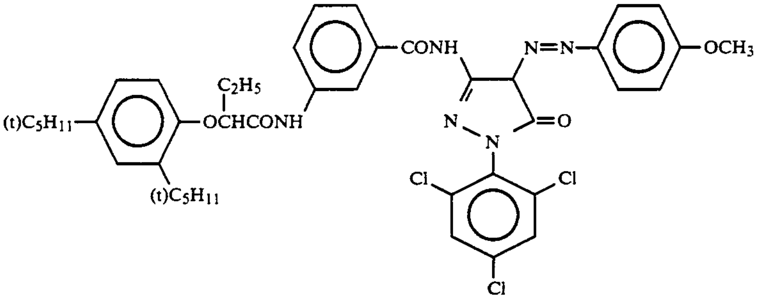
ExM-9
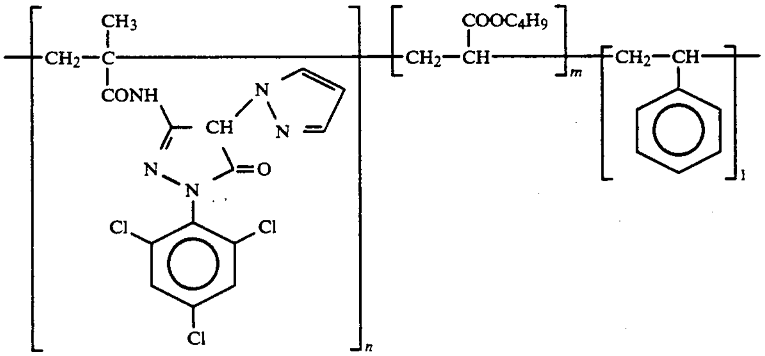
n/m/l = 50/25/25 (by weight)
mean molecular weight: 20,000

-continued
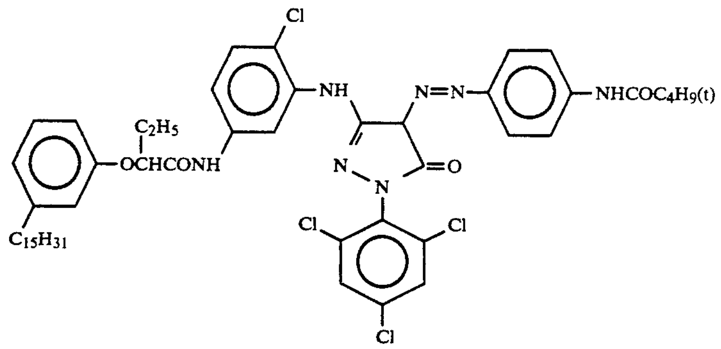
ExM-10
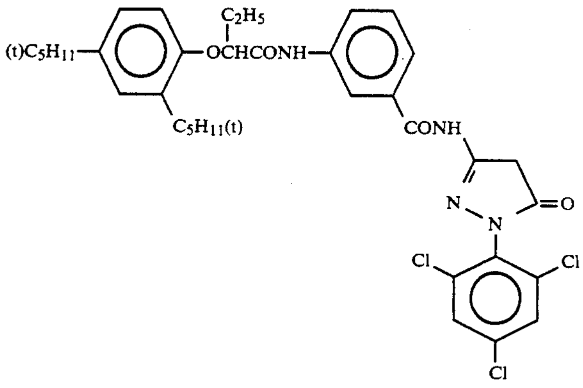
ExM-11
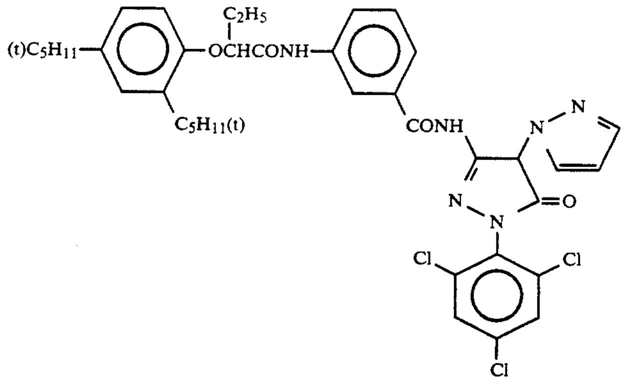
ExM-12
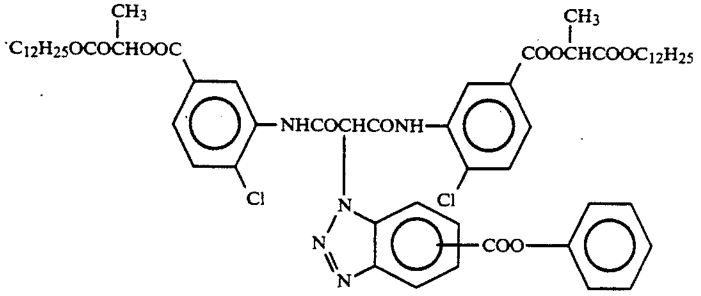
ExY-13

-continued
ExY-14
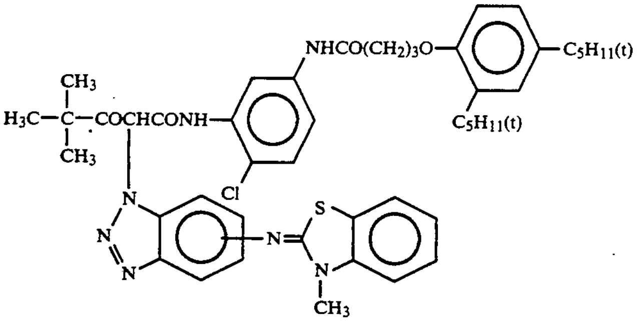
ExY-15
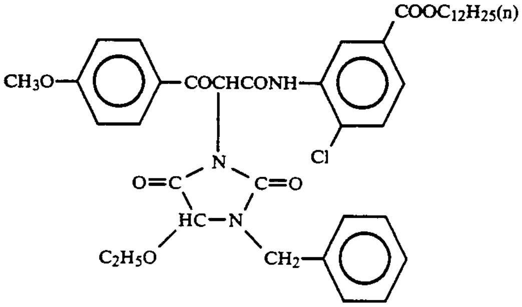
Cpd-1
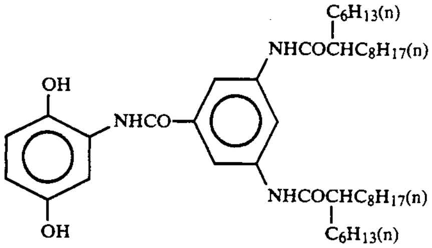
Cpd-2
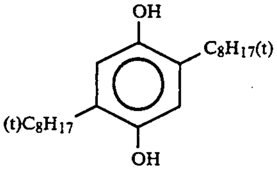
Cpd-3
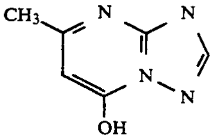
Cpd-4
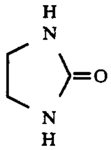
Cpd-5
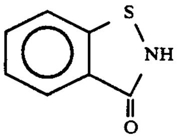
Cpd-6
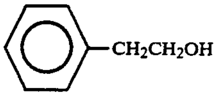
Cpd-7
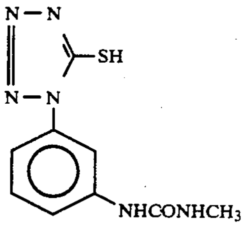
Cpd-8
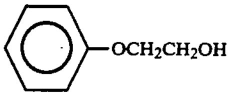

-continued
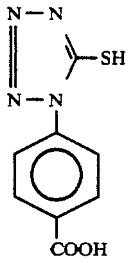
Cpd-9
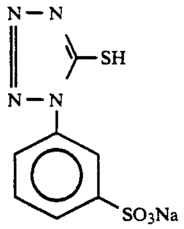
Cpd-10
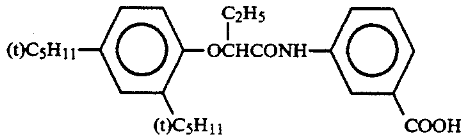
Cpd-11
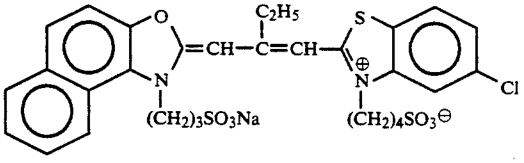
ExS-1
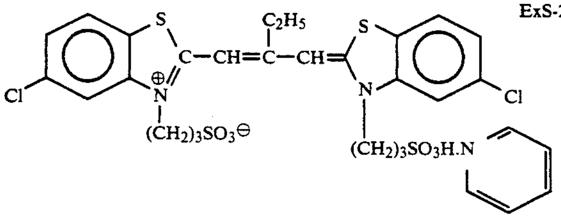
ExS-2
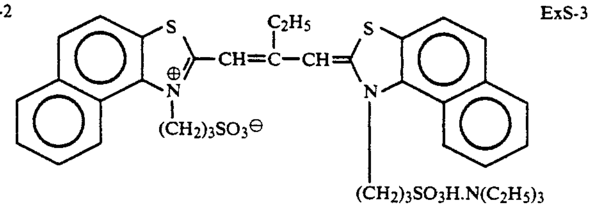
ExS-3
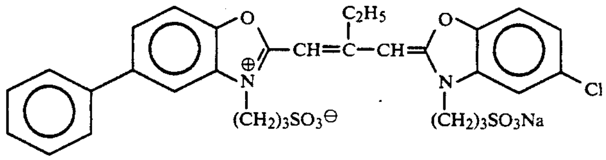
ExS-4
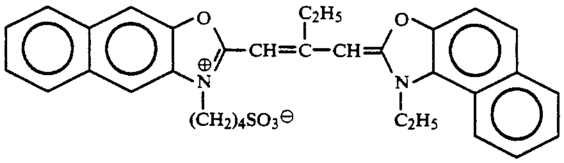
ExS-5
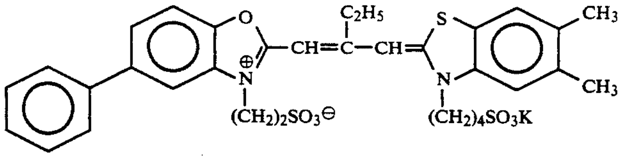
ExS-6
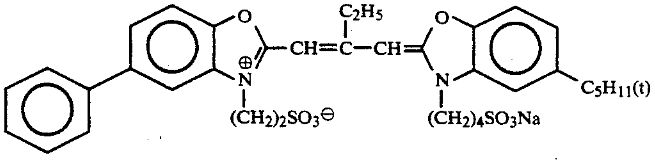
ExS-7
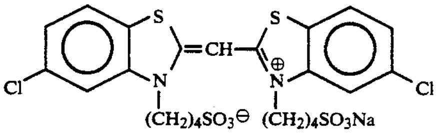
ExS-8
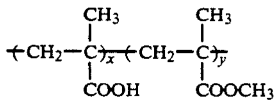
x/y = 10/90 (by mol)
B-1

-continued

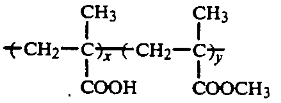
x/y = 40/60 (by mol)

B-2

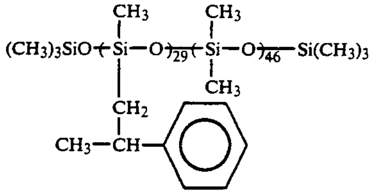

B-3

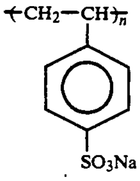

B-4

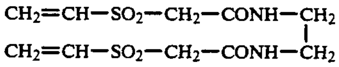

H-1

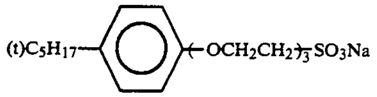

W-1

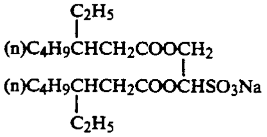

W-2

$C_8F_{17}SO_2N(C_3H_7)CH_2COOK$

W-3

Copolymer of vinyl pyrrolidone and vinyl alcohol (copolymerization ratio = 70:30 (by weight))

P-1

Polyethyl acrylate

P-2

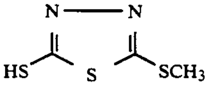

F-1

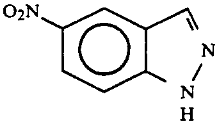

F-4

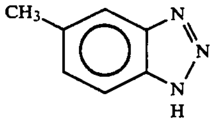

F-5

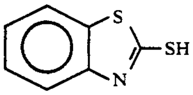

F-6

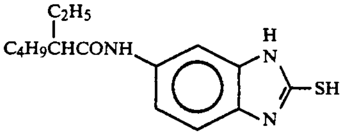

F-7

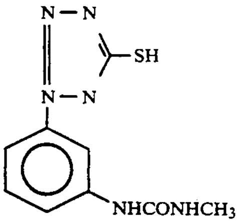

F-8

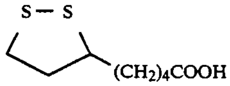

F-9

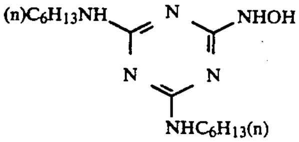

F-10

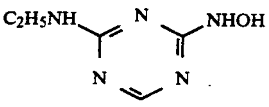

F-11

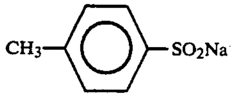

F-13

Next, Sample Nos. 402 and 403 were prepared in the same manner as Sample No. 401, except that ExY-13 in the 3rd, 4th, 7th, 8th, 9th and 11th layers was replaced by the same molar amount of a DIR coupler of the present invention, namely (D-1) or (D-6), respectively. The total dry thickness of all the coated layers, except the support and the subbing layer to the support, of each of the thus prepared samples was 17.9 μm.

Each sample was cut into a width of 35 mm, and, after imagewise exposure, processed in accordance with the process described below until the amount of replenisher added to the color developer became 30 liters. Subsequently, one meter of each of the non-exposed samples was processed in accordance with three different processing schemes, which differed from each other only with respect to processing time, as indicated in Table 4 below. The thus processed samples were subjected to a storage stability test where the samples were stored under forced dark, hot, and wet conditions of 80° C. and 70% RH for 10 days and the increase of the density of the non-exposed area, if any, was checked. Specifically, in the test, Dmin in the non-exposed area was measured with a blue light before and after the test, and the difference ΔD) between the two measured values was obtained to evaluate the stain-resistance of each sample on the basis of the following formula.

$$\Delta D=(Dmin \text{ after test})-(Dmin \text{ before test})$$

The results obtained are shown in Table 5 below.

Processing Method

Processing Method:

| Step | Processing Time | Processing Temp. | Amount of Replenisher* | Tank Capacity |
|---|---|---|---|---|
| Color Development | 2 min 30 sec | 38.0° C. | 400 ml | 15 liters |
| Bleaching | 50 sec | 38.0° C. | 140 ml | 5 liters |
| Bleach-Fixing | 50 sec | 38.0° C. | — | 5 liters |
| Fixing | 50 sec | 38.0° C. | 420 ml | 5 liters |
| Rinsing (1) | 30 sec | 38.0° C. | — | 3 liters |
| Rinsing (2) | 20 sec | 38.0° C. | 980 ml | 3 liters |
| Stabilization | 20 sec | 38.0° C. | 560 ml | 3 liters |
| Drying | 1 min | 55° C. | | |

*Amount of replenisher is per $m^2$ of sample.

In the process described above, rinsing was effected by a countercurrent system from the rinsing tank (2) to the rinsing tank (1). The top of the bleaching tank was connected to the bottom of the bleach-fixing tank via a pipe, and the top of the fixing tank was also connected to the bottom of the bleach-fixing tank via a pipe. Accordingly, all the overflows from the bleaching tank and the fixing tank caused by replenishment of replenishers thereto were introduced into the bleach-fixing bath. Replenishment to the bleach-fixing bath was effected in this way. The amount of the carryover of the developer to the next bleaching step, that of the bleaching solution to the next bleach-fixing step, that of the bleach-fixing solution to the next fixing step, and that of the fixing solution to the next rinsing step were all 50 ml, respectively, per $m^2$ of the photographic material being processed. In the process, the crossover time was always 5 seconds, and this crossover time is included in the processing time of the previous step.

The processing solutions used above were the same as those used in Example 1, except the developer which had the following composition.

Color Developer:

| | Mother Solution (g) | Replenisher (g) |
|---|---|---|
| Diethylenetriamine-pentaacetic Acid | 2.0 | 2.2 |
| 1-Hydroxyethylidene-1,1-diphosphonic Acid | 2.0 | 2.0 |
| Sodium Sulfite | 4.5 | 4.8 |
| Potassium Carbonate | 37.0 | 39.0 |
| Potassium Bromide | 1.6 | 0.3 |
| Potassium Iodide | 1.4 mg | — |
| Hydroxylamine Sulfate | 2.6 | 2.9 |
| 2-Methyl-4-[N-ethyl-N-(β-hydroxyethyl)-amino]aniline Sulfate | 5.4 | 8.1 |
| Water to make | 1.0 liter | 1.0 liter |
| pH | 10.15 | 10.21 |

TABLE 4

| Step | Processing Time Process (1) | Process (2) | Process (3) |
|---|---|---|---|
| Color Development | 2 min 30 sec | 2 min 30 sec | 2 min 30 sec |
| Bleaching | 50 sec | 40 sec | 20 sec |
| Bleach-Fixing | 50 sec | 40 sec | 20 sec |
| Fixing | 50 sec | 40 sec | 20 sec |
| Rinsing (1) | 30 sec | 25 sec | 20 sec |
| Rinsing (2) | 20 sec | 20 sec | 10 sec |
| Stabilization | 20 sec | 15 sec | 10 sec |
| Drying | 1 min 00 sec | 1 min 00 sec | 1 min 00 sec |

(In these steps, the condition of the processing temperature was same as that mentioned above.)

TABLE 5

| Experiment No. | Sample No. | Processing Time | Yellow Stain | |
|---|---|---|---|---|
| 4-1 | 401 | (1) | 0.11 | Comparative Example |
| 4-2 | " | (2) | 0.17 | Comparative Example |
| 4-3 | " | (3) | 0.21 | Comparative Example |
| 4-4 | 402 | (1) | 0.05 | Example of the Invention |
| 4-5 | " | (2) | 0.02 | Example of the Invention |
| 4-6 | " | (3) | 0.02 | Example of the Invention |
| 4-7 | 403 | (1) | 0.06 | Example of the Invention |
| 4-8 | " | (2) | 0.02 | Example of the Invention |
| 4-9 | " | (3) | 0.02 | Example of the Invention |

The above results show that the samples processed by the method of the present invention had less yellow stains after storage than those processed by the comparative method. Thus, the samples processed by the method of the invention have good storage stability. Where the samples were processed by process (2) or (3) in which the total processing time for the bleaching step and the subsequent steps except the drying step was 3 minutes or less, the excellent effect of the present invention was especially remarkable.

EXAMPLE 5

The same samples as those in Example 4 were processed in the same manner as in Example 4, except that the bleaching agent ammonium 1,3-propylenediaminetetraacetato/Fe(III) monohydrate was replaced by a different bleaching agent as indicated in Table 6 below, whereupon the difference in the bleaching fog between the samples processed in the present example and those processed in Example 4 was obtained. The amount of bleaching agent used was the same as that used in Example 4, and process (2) of Table 4 was employed.

The bleaching fog was calculated on the basis of the following formula, measuring Dmin of the non-exposed area of the fresh sample with a blue light.

$$\Delta D = (\text{Dmin of test sample}) - (\text{Dmin of comparative sample})$$

In the formula, "Dmin of comparative sample" is the value of Dmin measured with a blue light of the non-exposed area of Sample No. 401 of Example 4 processed in the same manner as in Example 4 except that the amount of the replenisher added to the color developer was 800 ml/$m^2$. The results obtained are shown in Table 6 below.

From the results, it is clear that generation of bleaching fog was minimal only when the samples were processed by the method of the present invention. Especially good results were obtained when a bleaching agent having a redox potential of 150 mV or more was used.

TABLE 6

| Experiment No. | Sample No. | Bleaching Agent(*) (Redox Potential) | Bleaching Fog | |
|---|---|---|---|---|
| 5-1 | 401 | EDTA.Fe (110 mV) | 0.08 | Comparative Example |
| 5-2 | " | PDTA.Fe (250 mV) | 0.14 | Comparative Example |
| 5-3 | " | BDTA.Fe (230 mV) | 0.13 | Comparative Example |
| 5-4 | " | MIDA.Fe (200 mV) | 0.12 | Comparative Example |
| 5-5 | 402 | EDTA.Fe (110 mV) | 0.04 | Example of the Invention |
| 5-6 | " | PDTA.Fe (250 mV) | 0.01 | Example of the Invention |
| 5-7 | " | BDTA.Fe (230 mV) | 0.01 | Example of the Invention |
| 5-8 | " | MIDA.Fe (200 mV) | 0.01 | Example of the Invention |
| 5-9 | 403 | EDTA.Fe (110 mV) | 0.04 | Example of the Invention |
| 5-10 | " | PDTA.Fe (250 mV) | 0.01 | Example of the Invention |
| 5-11 | " | BDTA.Fe (230 mV) | 0.01 | Example of the Invention |
| 5-12 | " | MIDA.Fe (200 mV) | 0.01 | Example of the Invention |

(*)Abbreviations of bleaching agents are as follows
EDTA.Fe: Ethylenediaminetetraacetato/Fe(III)
PDTA.Fe: 1,3-Propylenediaminetetraacetato/Fe(III)
BDTA.Fe: 1,4-Butylenediaminetetraacetato/Fe(III)
MIDA.Fe: Methyliminodiacetato/Fe(III)

In accordance with the method of the present invention, the amount of replenisher added to the color developer to be used may be reduced significantly, and the photographic properties of the processed materials may greatly be improved while preventing generation of bleaching fog and yellow stains.

While the invention has been described in detail and with reference to specific embodiments, it will be apparent to one skilled in the art that various changes and modifications can be made therein without departing from the spirit and scope thereof.

What is claimed is:

1. A method of processing a silver halide color photographic material comprising a support having provided thereon at least one light-sensitive emulsion layer, which comprises the steps of color developing the material with a developer to which a replenisher is added and bleaching the developed material, wherein the material contains a coupler represented by the following general formula (I) and the amount of replenisher added to the color developer is 600 ml or less per $m^2$ of the material:

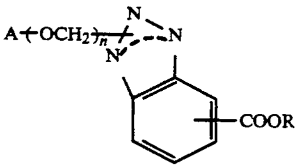
(I)

wherein n is 0 and A is represented by formula (Cp-4) or (Cp-5)

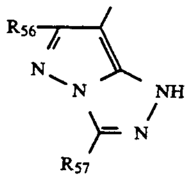
(Cp-4)

Amendment Under 37 CFR 1.115
Ser. No. 07/685,771

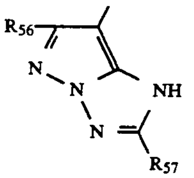
(Cp-5)

wherein $R_{56}$ and $R_{57}$ each represents $R_{43}$—, $R_{41}NS$—, $R_{43}O$—, $R_{41}CON(R_{43})$—, or $R_{41}SO_2N(R_{43})$—, $R_{41}$ represents an aliphatic group, an aromatic group or a heterocyclic group and $R_{43}$ represents a hydrogen atom, an aliphatic group an aromatic group or a heterocyclic group.

2. The method of processing a silver halide color photographic material as in claim 1, wherein the amount of replenisher added to the color developer is from 100 ml to 500 ml per $m^2$ of the material.

3. The method of processing a silver halide color photographic material as in claim 1, wherein the total processing time for processing the material with processing solutions after the bleaching step and before the drying step is 1 minute to 3 minutes.

4. The method of processing a silver halide color photographic material as in claim 1, wherein the bleaching step is performed with a processing solution having a bleaching ability which contains an oxidizing agent having a redox potential of at least 150 mV.

5. The method of processing a silver halide color photographic material as in claim 1, wherein R in formula (I) is an alkyl group substituted with a substituent selected from the group consisting of an alkoxycarbonyl group, a carbamoyl group, a halogen atom, a nitro group, a cyano group, an alkoxy group, a sulfamoyl group, an aryloxy group, an acyl group, a sulfonyl group, a heterocyclic group, and a phosphoryl group or a pyridyl group substituted with a substituent selected from the group consisting of an alkoxycarbonyl group, a carbamoyl group, a halogen atom, a nitro group, a cyano group, an alkoxy group, a sulfamoyl group, an aryloxy group, an acyl group, a sulfonyl group, a heterocyclic group, a phosphoryl group, and an aliphatic group.

6. The method of processing a silver halide color photographic material as in claim 1, wherein $R_{56}$ and $R_{57}$ each are an aliphatic group, an aromatic group, $R_{41}O$—, or $R_{41}S$—, wherein $R_{41}$ represents an aliphatic group, an aromatic group or a heterocyclic group.

7. The method of processing a silver halide color photographic material as in claim 1, wherein said coupler of formula (I) is added to at least one light-sensitive silver halide emulsion layer and adjacent layers thereof constituting said photographic material.

8. The method of processing a silver halide color photographic material as in claim 1, wherein the total amount of said coupler of formula (I) is from $3\times10^{-7}$ to $1\times10^{-3}$ mol/$m^2$.

9. The method of processing a silver halide color photographic material as in claim 1, wherein the bleaching step is conducted under the presence of a bleaching solution or a bleach-fixing solution.

10. The method of processing a silver halide color photographic material as in claim 1, wherein the amount of replenisher added to the color developer is from 100 ml to 400 ml per $m^2$ of the material.

11. The method of processing a silver halide color photographic material as in claim 1, wherein the amount of replenisher added to the color developer is from 100 ml to 300 ml per $m^2$ of the material.

12. The method of processing a silver halide color photographic material as in claim 1, wherein R represents a substituted alkyl group having from 1 to 4 carbon atoms substituted with an alkoxycarbonyl group or a carbamoyl group.

13. The method of processing a silver halide color photographic material as in claim 12, wherein $R_{56}$ and $R_{57}$ each are an aliphatic group, an aromatic group, $R_{41}O$—, or $R_{41}S$—.

* * * * *